United States Patent
Krislov

(10) Patent No.: US 8,589,372 B2
(45) Date of Patent: *Nov. 19, 2013

(54) METHOD AND SYSTEM FOR AUTOMATED DOCUMENT REGISTRATION WITH CLOUD COMPUTING

(71) Applicant: Clinton A. Krislov, Chicago, IL (US)

(72) Inventor: Clinton A. Krislov, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/726,225

(22) Filed: Dec. 24, 2012

(65) Prior Publication Data

US 2013/0138619 A1    May 30, 2013

Related U.S. Application Data

(63) Continuation-in-part of application No. 12/638,268, filed on Dec. 15, 2009, now Pat. No. 8,341,141.

(60) Provisional application No. 61/201,833, filed on Dec. 16, 2008.

(51) Int. Cl.
    *G06F 17/30* (2006.01)

(52) U.S. Cl.
    USPC .......................................... 707/705; 707/706

(58) Field of Classification Search
    USPC ................................................. 707/706, 707
    See application file for complete search history.

(56) References Cited

U.S. PATENT DOCUMENTS

| | | | | |
|---|---|---|---|---|
| 4,827,508 A | * | 5/1989 | Shear | 705/53 |
| 4,977,594 A | * | 12/1990 | Shear | 705/53 |
| 5,050,213 A | * | 9/1991 | Shear | 705/53 |
| 5,410,598 A | * | 4/1995 | Shear | 705/53 |
| 5,422,953 A | * | 6/1995 | Fischer | 713/172 |
| 5,450,493 A | * | 9/1995 | Maher | 380/30 |
| 5,530,235 A | * | 6/1996 | Stefik et al. | 235/492 |
| 5,534,975 A | * | 7/1996 | Stefik et al. | 399/1 |
| 5,566,230 A | * | 10/1996 | Cairo | 379/93.07 |
| 5,629,980 A | * | 5/1997 | Stefik et al. | 705/54 |
| 5,634,012 A | * | 5/1997 | Stefik et al. | 705/39 |
| 5,638,443 A | | 6/1997 | Stefik et al. | |
| 5,638,446 A | | 6/1997 | Rubin | |
| 5,715,403 A | | 2/1998 | Stefik | |
| 5,809,116 A | | 9/1998 | Cairo | |
| 5,809,144 A | | 9/1998 | Sirbu et al. | |
| 5,815,555 A | | 9/1998 | Cairo | |
| 5,818,955 A | | 10/1998 | Smithies et al. | |
| 5,892,900 A | | 4/1999 | Ginter et al. | |
| 5,896,499 A | | 4/1999 | McKelvey | |
| 5,910,987 A | | 6/1999 | Ginter et al. | |
| 5,915,019 A | | 6/1999 | Ginter et al. | |

(Continued)

*Primary Examiner* — Baoquoc N To
(74) *Attorney, Agent, or Firm* — Lesavich High-Tech Law Group, P.C.; Stephen Lesavich

(57) ABSTRACT

A method and system for automated document registration with cloud computing. The method and system described herein provide an automatic cloud document registration system that creates a secure cloud transformed electronic document with an unalterable time and date stamp stored in a cloud storage object. The cloud storage object comprises plural separate portions stored in plural separate secure storage locations on plural other different server network devices distributed across the cloud communications network but functions as a single secure cloud storage object. Target and server network devices cannot determine where on the cloud communications network the cloud storage object is stored thereby providing additional security and privacy for the secure cloud transformed electronic document. Multiple third-parties are provided an ability to view a given original document in the secure cloud transformed electronic document format from anywhere on the cloud communications network.

20 Claims, 20 Drawing Sheets

(56) References Cited

U.S. PATENT DOCUMENTS

| | | |
|---|---|---|
| 5,917,912 A | 6/1999 | Ginter et al. |
| 5,920,861 A | 7/1999 | Hall et al. |
| 5,940,504 A | 8/1999 | Griswold |
| 5,943,422 A | 8/1999 | Van Wie et al. |
| 5,949,876 A | 9/1999 | Ginter et al. |
| 5,956,154 A | 9/1999 | Cairo |
| 5,982,891 A | 11/1999 | Ginter et al. |
| 5,999,949 A | 12/1999 | Crandall |
| 6,073,242 A | 6/2000 | Hardy et al. |
| 6,112,181 A | 8/2000 | Shear et al. |
| 6,138,119 A | 10/2000 | Hall et al. |
| 6,145,079 A | 11/2000 | Mitty et al. |
| 6,157,721 A | 12/2000 | Shear et al. |
| 6,185,683 B1 | 2/2001 | Ginter et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,263,436 B1 | 7/2001 | Franklin et al. |
| 6,289,460 B1 | 9/2001 | Hajmiragha |
| 6,292,569 B1 | 9/2001 | Shear et al. |
| 6,363,488 B1 | 3/2002 | Ginter et al. |
| 6,367,013 B1 | 4/2002 | Bisbee et al. |
| 6,381,695 B2 | 4/2002 | Kudo et al. |
| 6,389,402 B1 | 5/2002 | Ginter et al. |
| 6,427,140 B1 | 7/2002 | Ginter et al. |
| 6,430,688 B1 | 8/2002 | Kohl et al. |
| 6,435,410 B2 | 8/2002 | Edens et al. |
| 6,449,367 B2 | 9/2002 | Van Wie et al. |
| 6,470,448 B1 | 10/2002 | Kuroda et al. |
| 6,510,513 B1 | 1/2003 | Danieli |
| 6,587,945 B1 | 7/2003 | Pasieka |
| 6,618,484 B1 | 9/2003 | Van Wie et al. |
| 6,640,304 B2 | 10/2003 | Ginter et al. |
| 6,658,568 B1 | 12/2003 | Ginter et al. |
| 6,668,325 B1 | 12/2003 | Collberg et al. |
| 6,732,101 B1 | 5/2004 | Cook |
| 6,785,815 B1 | 8/2004 | Serret-Avila et al. |
| 6,820,202 B1 | 11/2004 | Wheeler et al. |
| 6,832,316 B1 | 12/2004 | Sibert |
| 6,886,096 B2 | 4/2005 | Appenzeller |
| 6,904,416 B2 | 6/2005 | Nassiri |
| 6,931,532 B1 | 8/2005 | Davis |
| 6,986,037 B1 | 1/2006 | Assmann |
| 7,046,991 B2 | 5/2006 | Little |
| 7,131,003 B2 | 10/2006 | Lord |
| 7,136,840 B2 | 11/2006 | Pinkas |
| 7,162,738 B2 | 1/2007 | Dickinson, III |
| 7,231,517 B1 | 6/2007 | Mashayekhi |
| 7,240,199 B2 | 7/2007 | Tomkow |
| 7,281,133 B2 | 10/2007 | Ginter et al. |
| 7,392,395 B2 | 6/2008 | Ginter et al. |
| 7,587,369 B2 | 9/2009 | Ginter et al. |
| 7,788,485 B2 | 8/2010 | Connell |
| 7,793,107 B2 | 9/2010 | Takahashi |
| 8,314,141 B2 | 11/2012 | Tung et al. |
| 8,463,765 B2 | 6/2013 | Lesavich |
| 2001/0042043 A1 | 11/2001 | Shear et al. |
| 2002/0023214 A1 | 2/2002 | Shear et al. |
| 2002/0048369 A1 | 4/2002 | Ginter et al. |
| 2002/0059144 A1 | 5/2002 | Meffert et al. |
| 2002/0087859 A1 | 7/2002 | Weeks et al. |
| 2002/0091928 A1 | 7/2002 | Bouchard et al. |
| 2002/0112171 A1 | 8/2002 | Ginter et al. |
| 2002/0143710 A1 | 10/2002 | Liu |
| 2002/0152173 A1 | 10/2002 | Rudd |
| 2003/0023856 A1 | 1/2003 | Horne et al. |
| 2003/0041239 A1 | 2/2003 | Shear et al. |
| 2003/0046244 A1 | 3/2003 | Shear et al. |
| 2003/0069748 A1 | 4/2003 | Shear et al. |
| 2003/0069749 A1 | 4/2003 | Shear et al. |
| 2003/0088771 A1 | 5/2003 | Merchen |
| 2003/0105721 A1 | 6/2003 | Ginter et al. |
| 2003/0163431 A1 | 8/2003 | Ginter et al. |
| 2004/0054630 A1 | 3/2004 | Ginter et al. |
| 2004/0059951 A1 | 3/2004 | Pinkas et al. |
| 2004/0073813 A1 | 4/2004 | Pinkas et al. |
| 2004/0103305 A1 | 5/2004 | Ginter et al. |
| 2004/0107356 A1 | 6/2004 | Shamoon et al. |
| 2004/0123129 A1 | 6/2004 | Ginter et al. |
| 2004/0133793 A1 | 7/2004 | Ginter et al. |
| 2005/0027871 A1 | 2/2005 | Bradley et al. |
| 2005/0050332 A1 | 3/2005 | Serret-Avila et al. |
| 2005/0060560 A1 | 3/2005 | Sibert |
| 2005/0060584 A1 | 3/2005 | Ginter et al. |
| 2005/0108555 A1 | 5/2005 | Sibert |
| 2010/0153407 A1 | 6/2010 | Krislov |
| 2011/0208710 A1 | 8/2011 | Lesavich |
| 2011/0270760 A1 | 11/2011 | Graham et al. |
| 2011/0270761 A1 | 11/2011 | Graham et al. |
| 2011/0270763 A1 | 11/2011 | Graham et al. |
| 2011/0276493 A1 | 11/2011 | Graham et al. |
| 2012/0278622 A1 | 11/2012 | Lesavich et al. |
| 2013/0138619 A1 | 5/2013 | Krislov |

* cited by examiner

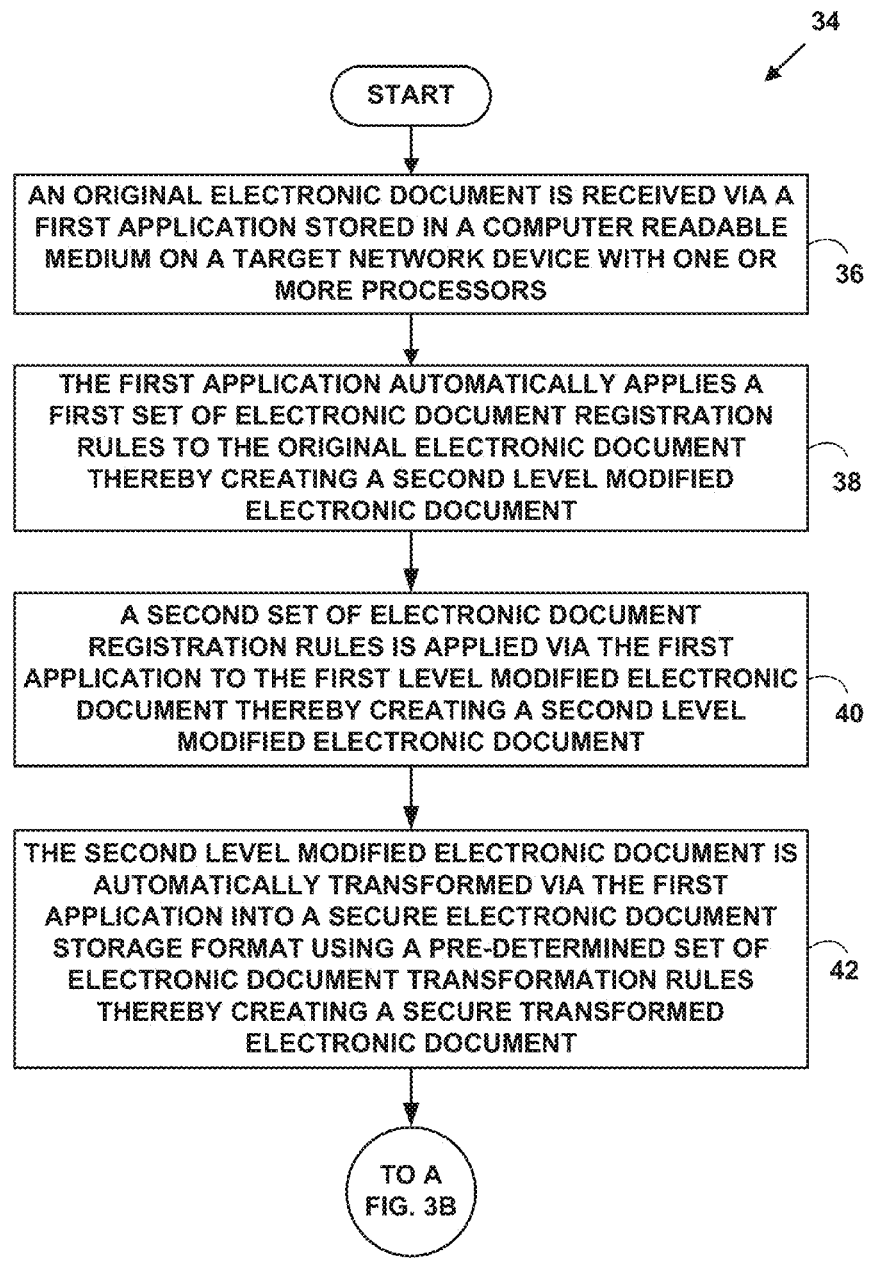

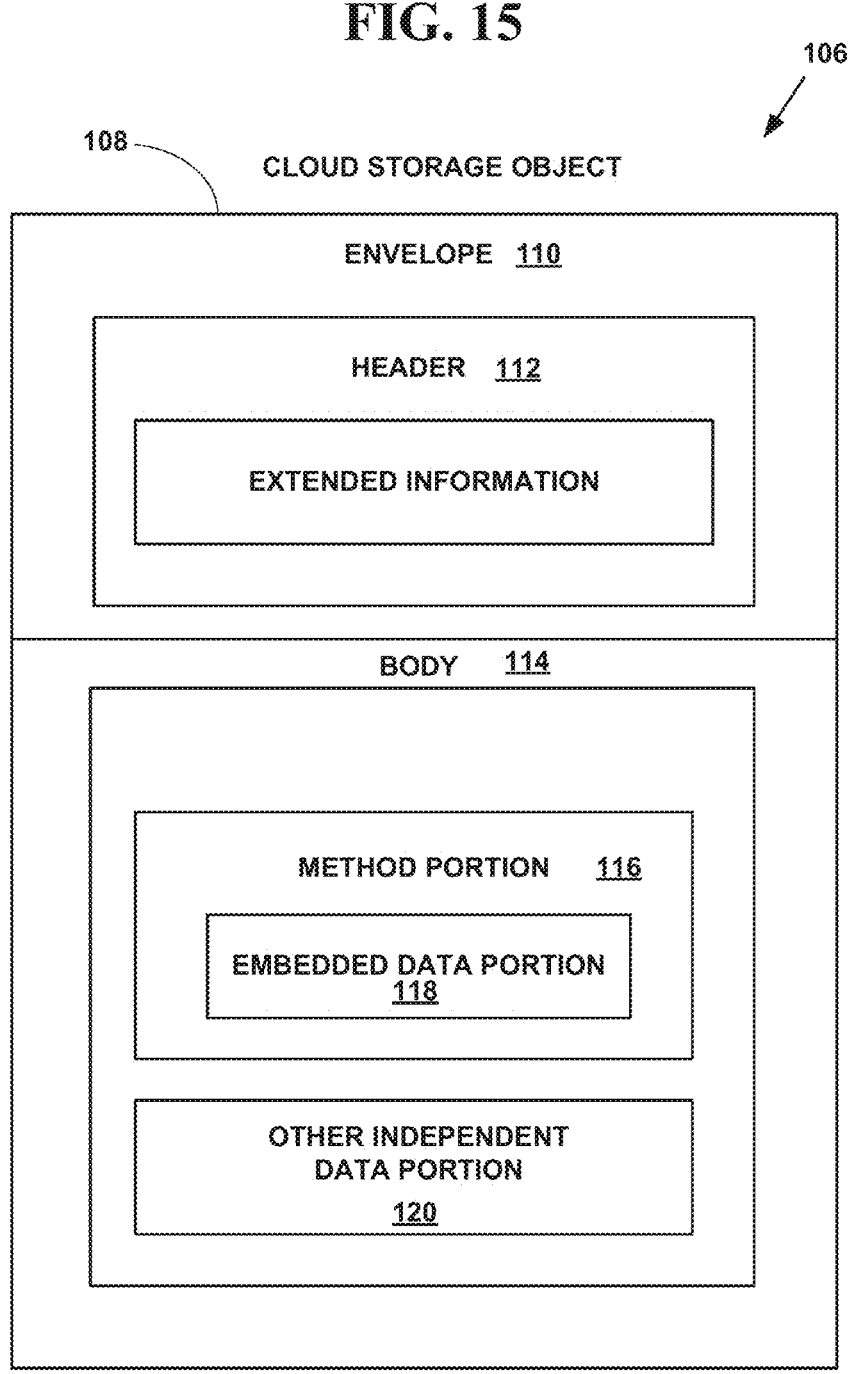

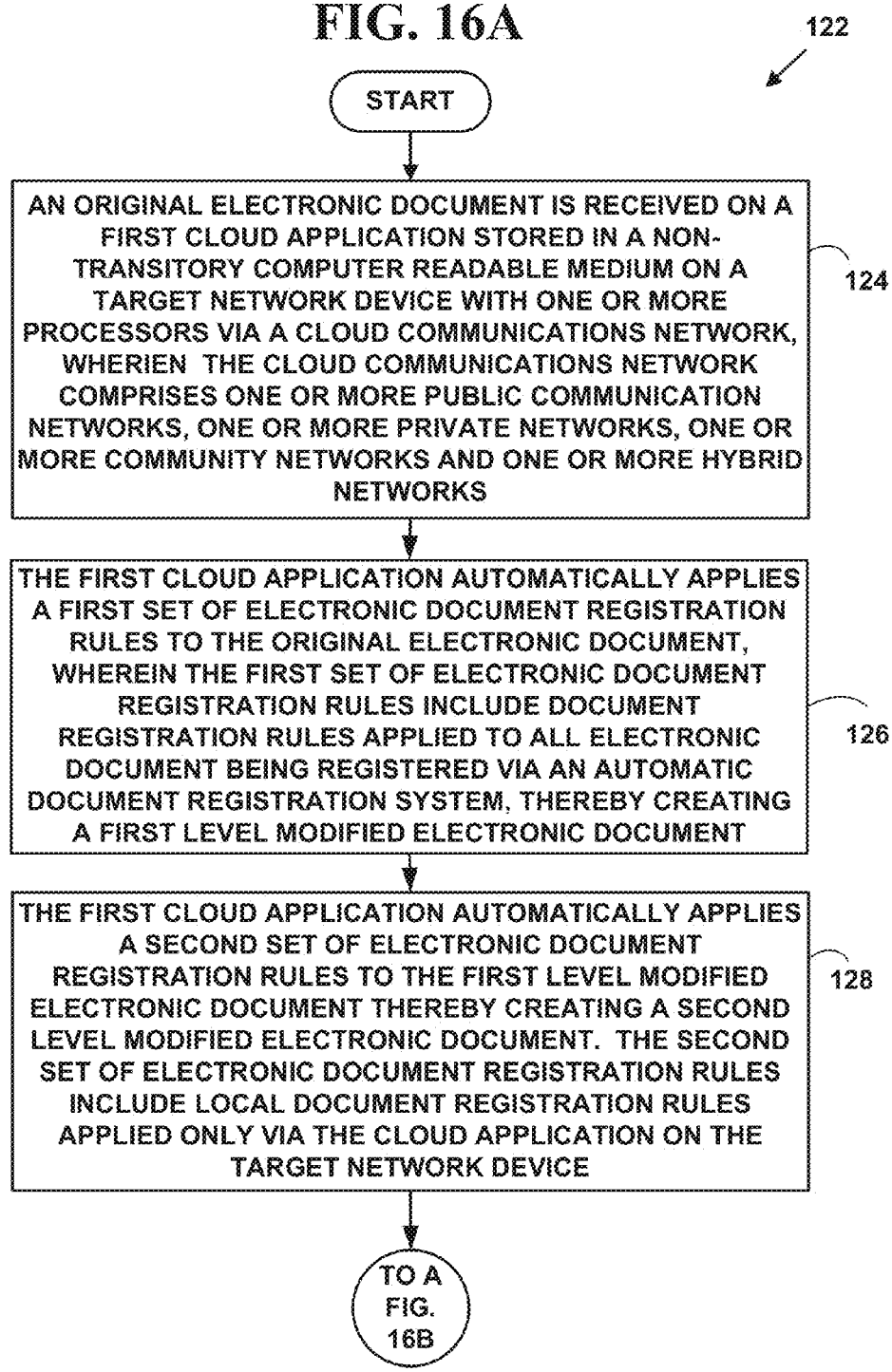

FIG. 16B

| |
|---|
| THE FIRST CLOUD APPLICATION AUTOMATICALLY TRANSFORMS THE SECOND LEVEL MODIFIED ELECTRONIC DOCUMENT INTO A SECURE CLOUD ELECTRONIC DOCUMENT STORAGE FORMAT USING A PRE-DETERMINED SET OF ELECTRONIC DOCUMENT TRANSFORMATION RULES THEREBY CREATING A SECURE CLOUD TRANSFORMED ELECTRONIC DOCUMENT — 130 |

| |
|---|
| THE FIRST CLOUD APPLICATION AUTOMATICALLY GENERATES PLURAL ELECTRONIC DOCUMENT REGISTRATION CODES FOR THE SECURE CLOUD TRANSFORMED ELECTRONIC DOCUMENT. THE PLURAL ELECTRONIC DOCUMENT REGISTRATION CODES INCLUDE AN UNALTERABLE DATE AND TIME STAMP, AN IDENTIFICATION CODE AND ONE OR MORE ENCRYPTION CODES — 132 |

| |
|---|
| THE FIRST APPLICATION FROM THE TARGET NETWORK DEVICE SECURELY TRANSFERS THE SECURE CLOUD TRANSFORMED ELECTRONIC DOCUMENT VIA THE VIA THE CLOUD COMMUNICATIONS NETWORK TO A CLOUD SERVER NETWORK DEVICE WITH ONE OR MORE PROCESSORS, ONE OR MORE DIFFERENT DATABASES AND A SECOND CLOUD APPLICATION EXECUTING IN A SECOND NON-TRANSITORY COMPUTER READABLE MEDIUM ON THE SEVER NETWORK DEVICE — 134 |

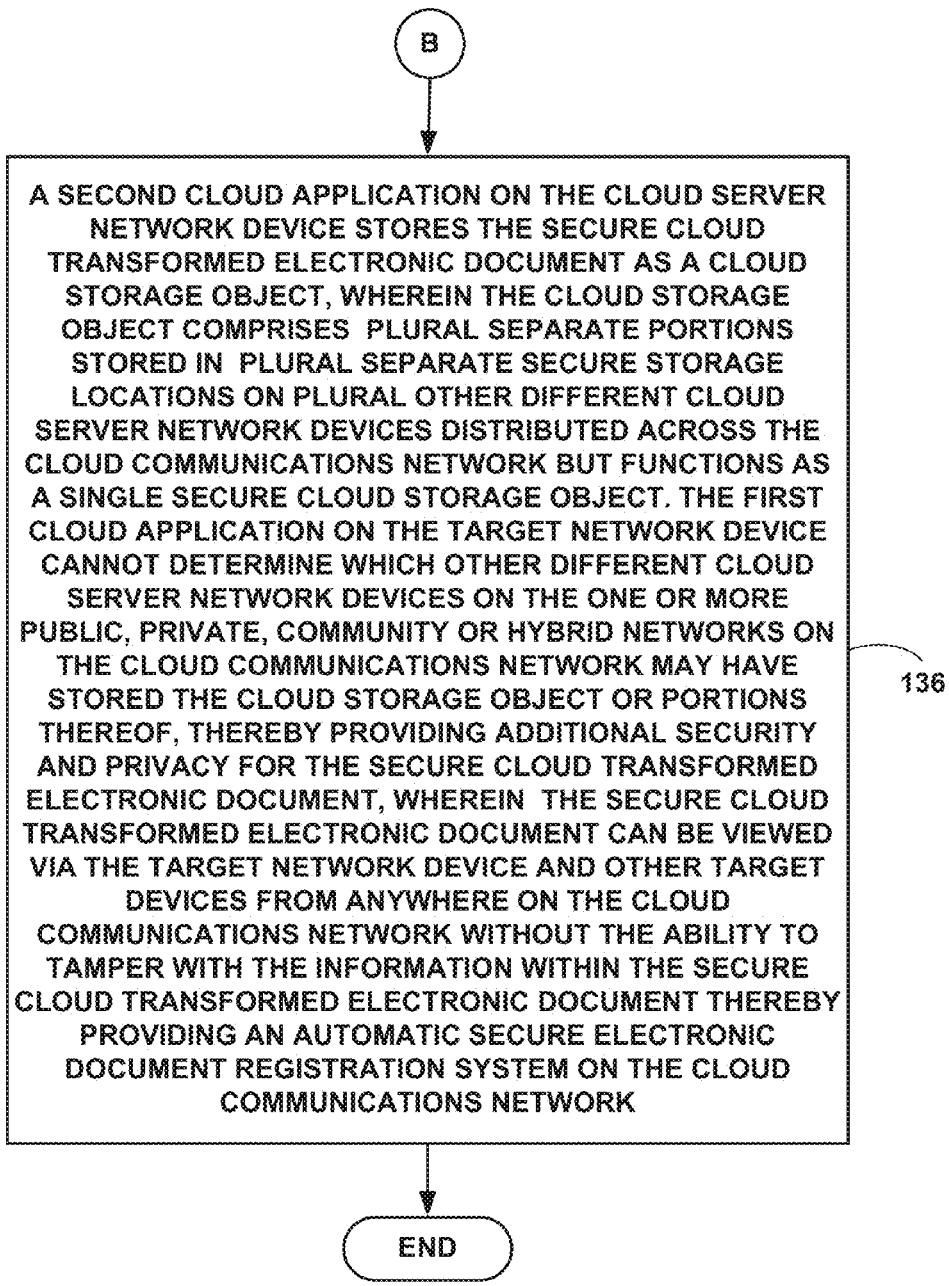

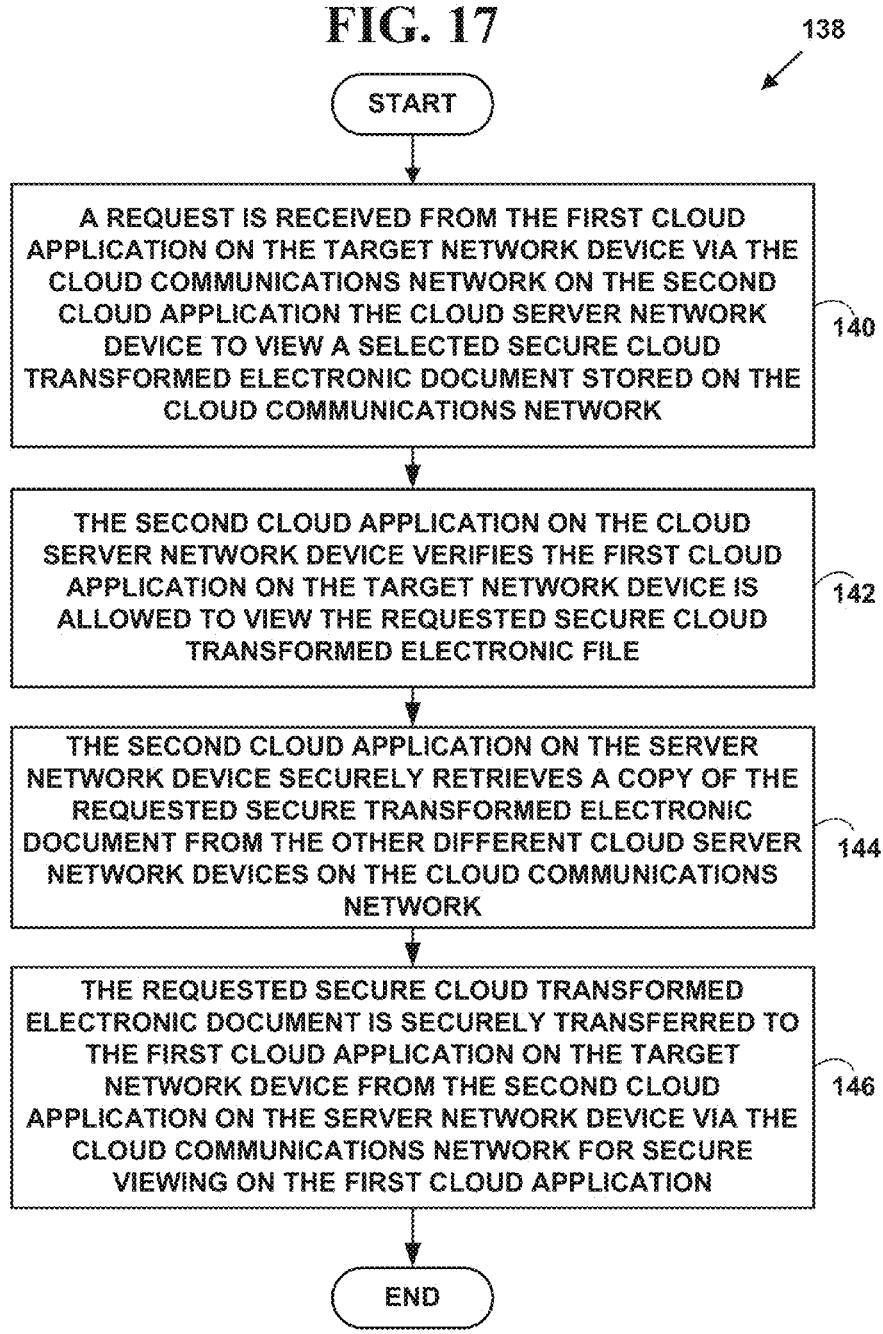

US 8,589,372 B2

METHOD AND SYSTEM FOR AUTOMATED DOCUMENT REGISTRATION WITH CLOUD COMPUTING

CROSS REFERENCES TO RELATED APPLICATIONS

This application is a Continuation-In-Part (CIP) of U.S. Utility patent application Ser. No. 12/638,268, filed Dec. 15, 2009, that issued as U.S. Pat. No. 8,341,141, on Dec. 25, 2012, U.S. Utility patent application Ser. No. 12/638,268, claiming priority to U.S. Provisional patent application 61/201,833, filed Dec. 16, 2008, the contents of all of which are incorporated by reference.

FIELD OF THE INVENTION

The present invention relates to electronic documents. More specifically the present invention relates to a system and method for providing reliable independent confirmation of existence and content of an electronic document at a verifiable point in time with cloud computing.

BACKGROUND OF THE INVENTION

In many instances, it is important to assign a confirmed, certifiable and non-alterable date to a critical document or work. Inherent in such efforts is the need to describe the accuracy, once the criteria for such dating is settled upon, careful documentation of a work demands a high level of specificity and detail in identifying the content of the work that is to be documented. At times, unique problems arise from the desire to provide careful documentation of a work as its undergoes continuing evolution. In such instances, minute changes can become buried in a torrent of ongoing revisions and additions, and it may not be known at the time, what versions of a work will have significance in the future.

There is an obvious need to share documents within and between entities in a secure and time-verified manner. There could be innumerable reasons for the sharing of documents between entities, but two prominent reasons are for the verification of actions and the settling of disputes. Entities could be individuals, businesses, departments or individuals within a business, government agencies, or any type of organization.

There are currently various methods whereby the contents of a document can be verified at a specific time. For example, when an entity files a document with a government agency, or when a document is faxed or emailed from one entity to another or when a document is physically received. These methods meet specific needs at certain times, but they are inefficient and unsuitable for general use, corporate use, government use, The government is not in the business of verifying documents and dates to third-parties; faxing can result in poor quality reproductions and incorrect timestamps; and fax and email timestamps can also be tampered with, and it is not desirable to email sensitive documents over a public network, and the recipient comes into possession of a document that could be edited and then forwarded as genuine.

When a document is shared between parties, the receiving party can only be certain of the state of the document at that point in time, unless there is an independent, trusted third-party verification of the state of the document at a prior point in time. The broad-based use of digital documents, combined with the availability of software tools that allow the editing and manipulation of digital documents, increase the possibility of tampering and forgery of documents, which creates risk for the receiving party. The system time of computers can be manually re-set, or manipulated causing a false create or modification date to display. Furthermore, with ad hoc methods such as faxing or email document submission, there are additional problems, for example: keeping track of document versions with these methods is prone to human error; also, keeping track of who has access to the documents, in other words, who received copies of all versions of all shared documents, and who those recipients shared the documents with, is administratively very problematic.

There is clearly a need that such documents should be available across a cloud communications network.

There is clearly a need for an automated process that enables entities to securely share time-verified content, audit content and actions on the content on a selective basis on a cloud communications network.

SUMMARY OF THE INVENTION

In accordance with preferred embodiments of the present invention, some of the problems associated with registering electronic documents are overcome. A method and system for automated document registration with cloud computing is presented.

The method and system described herein provide an automatic cloud document registration system that creates a secure cloud transformed electronic document with an unalterable time and date stamp stored in a cloud storage object. The cloud storage object comprises plural separate portions stored in plural separate secure storage locations on plural other different server network devices distributed across the cloud communications network but functions as a single secure cloud storage object. Target and server network devices cannot determine where on the cloud communications network the cloud storage object is stored thereby providing additional security and privacy for the secure cloud transformed electronic document. Multiple third-parties are provided an ability to view a given original document in the secure cloud transformed electronic document format from anywhere on the cloud communications network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 3A and 3B are a flow diagram illustrating a method for automatic electronic document registration;

FIG. 15 is a block diagram illustrating an exemplary cloud storage object;

FIGS. 16A, 16B and 16C are a flow diagram illustrating a method for automatic electronic document registration with cloud computing; and FIG. 17 is a flow diagram illustrating a method for viewing secure cloud transformed electronic documents transformed with method of FIG. 16.

DETAILED DESCRIPTION OF THE INVENTION

Exemplary Document Registration System

Figure 1:
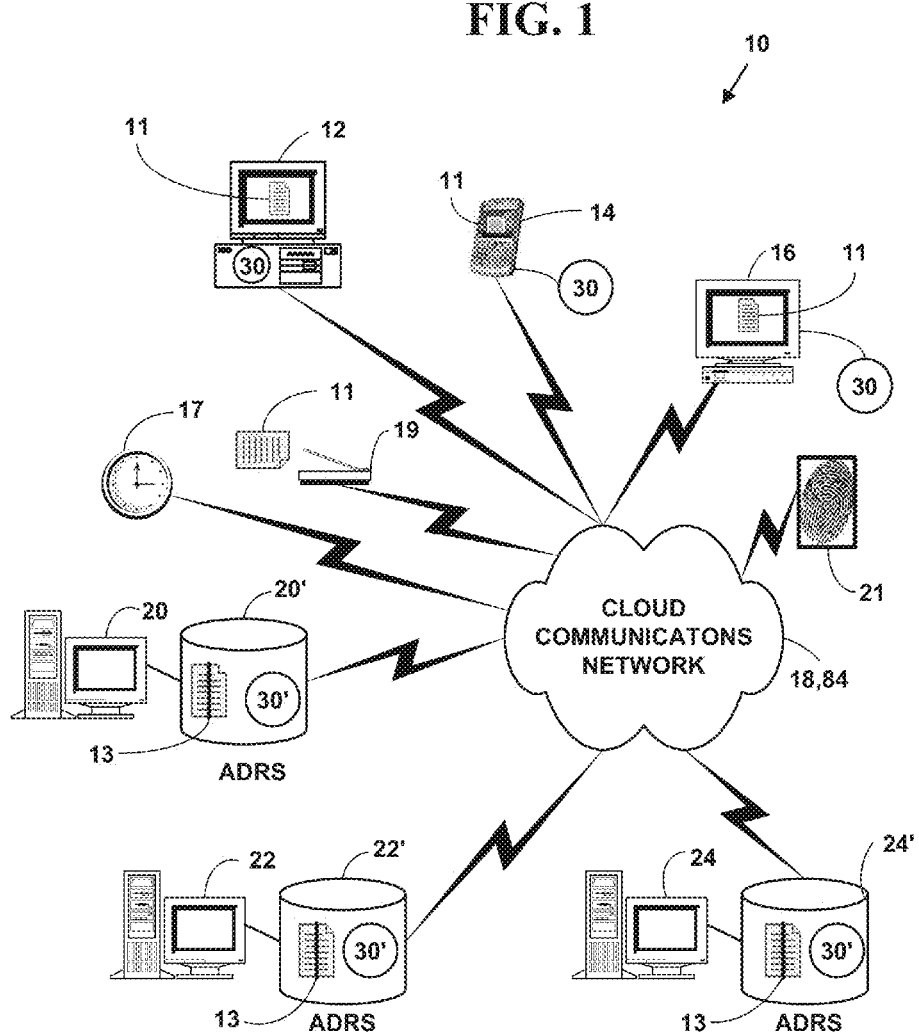
FIG. 1 is a block diagram illustrating an exemplary electronic document registration system.

FIG. 1 is a block diagram illustrating an exemplary electronic document registration system 10. The exemplary electronic document registration system 10 includes, but is not limited to, one or more target network devices 12, 14, 16 (only three of which are illustrated). However, the present invention is not limited to these target network devices and more, fewer or others types of target network devices can also be used. The one or more target devices 12, 14, 16 are used to create, display, transfer and/or register electronic files.

The target devices 12, 14, 16 are in communications with a cloud communications network 18. The cloud communications network 18 includes communications including, but is not limited to, communications over a wire connected to the target network devices 12, 14, 16, wireless communications, and other types of communications using one or more communications and/or networking protocols. The target network devices 12, 14, 16 include one or more original electronic documents 11. The original electronic documents 11 include, but are not limited to, electronic text, audio, video, graphical, digital image, object images, executable files, digital data files, and other types of original electronic documents 1.

The system further includes plural server network devices 20, 22, 24 (only three of which are illustrated) include one or more associated databases 20', 22', 24' (numbered 20 prime, 22 prime, 24 prime). The plural server network devices 20, 22, 24 are in communications with the one or more target devices 12, 14, 16 via the cloud communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.). The one or more server network devices are also used to create, display, transfer and/or register secure transformed electronic documents 13.

The secure transformed electronic documents 13 are original electronic documents 11 transformed with the methods and systems described herein. The secure transformed electronic documents include secure cloud transformed electronic documents 13.

The plural server network devices 20, 22, 24 include, but are not limited to, servers used for securely registering original electronic documents.

The one or more target devices 12, 14, 16 include many different types of target network devices including, but not limited to, client terminals in communications with one or more servers, personal digital/data assistants (PDA), laptop computers, desktop computers, mobile computers, net book computers, Internet appliances, two-way pagers, mobile phones, smart phones such as the iPhone by Apple, Inc., Blackberry Storm and other models, by Research In Motion, Inc., Droid by Motorola, Inc, other smart phones, other mobile phones, etc., electronic tablets and tablet computers such as the iPad by Apple, digital cameras, portable and non-portable electronic gaming platforms (e.g., Play Station Portable (PSP) by Sony, the Gameboy and DS by Nintendo, XBOX by Microsoft, Wii, Nintendo, Play Station, by Sony, etc.) non-mobile phones, cable television (CATV) set-top boxes, satellite television boxes, or digital televisions including a high definition television (HDTV) or a three-dimensional (3D) television, or other similar desktop, mobile or hand-held electronic devices. However, the present invention is not limited to the devices described and other or equivalent electronic devices can also be used to practice the invention.

The cloud communications network 18 includes, but is not limited to, portions of the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

The cloud communications network 18 includes a wire or wireless, telecommunications network and/or a wired and/or wireless data network (e.g., Internet Protocol (IP) suite of protocols including Transmission Control Protocol (TCP), User Datagram Protocol (UDP), Lightweight Directory Access Protocol (LDAP), etc.).

The cloud communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer therefore support virtually any packet protocol.

The system 10 further includes a secure independent date/time stamp system 17. The date/time stamp system 17 securely provides an accurate date/time stamp to the system 10. The secure independent date/time stamp system 17 may be internal or external to the system 10.

The system 10 may further include one or more electronic scanners 19 (one of which is illustrated) for scanning in paper documents. The system 10 may further include one or more CD-ROM devices, DVD devices, USB devices, Micro-SD devices, etc. for securely storing electronic documents.

The system 10 may further include biometric readers 21 (one of which is illustrated). The biometric readers include, but are not limited to, iris scan readers, fingerprint readers, facial recognition readers and other types of biometric readers.

The various types of biometric readers 21 measure biometric patterns and biometric emissions. These patterns and emissions may be derived from measurements of features of a human body. These patterns may also be derived from measurements of physical features of an object or from patterns applied to an object such as on a label (e.g., a bar code, UPC code, RFID tag, etc. Patterns derived from physical features (such as fingerprints, iris patterns, DNA samples, etc.) or emissions (such as voices, other sounds, etc.) of the human body are referred to herein as "biometrics." The present invention finds particular utility in identification of objects and biometric identification of humans and/or non-human entities for securely registering electronic files.

In one embodiment, the databases 20', 22' 24' comprise relational databases. In one embodiment, the databases 20', 22' and 24' use the Lightweight Directory Access Protocol (LDAP) and a LDAP database layout structure. However, the present invention is not limited to a relational database or using the LDAP and other types of databases and database protocols can also be used to practice the invention.

In one embodiment, the databases 20' 22' 24' securely transform, register and store electronic documents. The system and method aggregates data from the databases 20' 22' 24' to a central Directory (e.g., LDAP directory, etc.). The data in the central Directory is an abstraction of the relational database records from databases 20' 22' 24'. The system 10 allows the capability to perform various auditing and reconciliation functions, in batch or real-time, on part or whole of the data in the Directory.

In one embodiment, the system 10 and stores the plural data sets in an LDAP directory. This model enables usage of the aggregated data without impacting the performance of the network elements 22, 22', 24, 24', and system 10. However, the present invention is not limited to such an embodiment and other embodiments can also be used to practice the invention.

In one embodiment, a centralized data model is used. The disparate nature of an operator's network infrastructure and system may cause difficult accessibility. This limitation is overcome by aggregating data and storing it at a centralized directory service (e.g., LDAP). This allows operators to easily and quickly access subscriber data of the disparate systems. This model also enables usage of the aggregated data without impacting the performance of the server network devices 20 22, 24, and system 10. Locating subscriber data at a centralized directory protocol provides many advantages over a decentralized model, including but not limited to ease of management, and greater control.

In one exemplary embodiment, the secure collection and secure return include, but are not limited to, securely transferring electronic files using encryption and other secure transport mechanisms described above (e.g., encryption, hashing, message digesting, secure sockets layer, transport level security, X.509, etc).

The target network devices 12, 14, 16 and the server network devices 20, 22, 24 include wired and wireless interfaces to communicate with the cloud communications network 18.

In one embodiment of the present invention, the wired interfaces corresponding networking protocols for wired connections to the Public Switched Telephone Network (PSTN) or a cable television network (CATV) including High-Definition TV (HDTV), Three-dimensional (3D) TV, or the Internet that connect the computers and network devices via one or more twisted pairs of copper wires, digital subscriber lines (e.g. DSL, ADSL, VDSL, etc.) coaxial cable, fiber optic cable, other connection media or other connection interfaces and via the wireless interfaces described herein. The PSTN is any public switched telephone network provided by AT&T, GTE, Sprint, MCI, SBC, Verizon and others.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the wireless interface includes a wireless sensor device that comprises an integral or separate Bluetooth and/or infra data association (IrDA) module for wireless Bluetooth or wireless infrared communications.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference.

More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The target devices 12, 14, 16 include a protocol stack with multiple layers based on the Internet Protocol or OSI network reference model. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), Instant-Messaging (IM) Short Message Services (SMS) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference. An IP address includes four sets of numbers divided by period (e.g., x.x.x.x) in the range of zero to 255. An IP address is a unique string of numbers that identifies a device on an IP based network.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

EXtensible Markup Language (XML) is XML (Extensible Markup Language) is a markup language for data that allows information and services to be encoded with meaningful structure and semantics that computers and humans can understand. XML is used for information exchange, and includes user-specified and industry-specified tags. For more information on XML, see IETF RFC 3023.

Media Access Control (MAC) is a data link layer protocol. A MAC address is a physical address of a device connected to a communications network, expressed as a 48-bit hexadecimal number. A MAC address is permanently assigned to each unit of most types of networking hardware, such as network interface cards (NICs), by manufacturers at the factory.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a cloud communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated 02/98, 09/99, 11/00 and 07/03 are incorporated herein by reference.

As is known in the art. H.324 is a video conferencing recommendation using Plain Old Telephone Service (POTS) lines. The ITU-T H.324 standards entitled "Terminal for low bit-rate multimedia communication" dated 02/98 and 03/02 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless cloud communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon. Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Lightweight Directory Access Protocol (LDAP) is a software protocol for enabling anyone to locate organizations, individuals, and other resources such as files and devices in a network, whether on the public Internet or on private intranet or other cloud communications network 18. LDAP is a "lightweight" version of Directory Access Protocol (DAP), which is part of X.500, a standard for directory services in a network.

An operating environment for the network devices, databases, interfaces, components of the system 10 include a processing system with one or more high speed Central Processing Unit(s) ("CPU") or one or more other processors and a memory or other computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory ("RAM")) or non-volatile (e.g., Read-Only Memory ("ROM")) mass storage system readable by the CPU. The non-transitory computer readable medium includes cooperating or interconnected or distributed computer readable medium, which exist exclusively on the processing system or be distributed among multiple interconnected processing systems that may be local or remote to the processing system and may be accessed by one or more CPUs or processors.

Preferred embodiments of the present invention include computers, servers network devices and interfaces that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

Security and Encryption

Devices and interfaces of the present invention may include security and encryption for secure wired and wireless communications and data storage. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

LDAP may be used with X.509 security. X.509 is public key digital certificate standard developed as part of the X.500 directory specification. X.509 is used for secure management and distribution of digitally signed certificates across networks.

Exemplary Document Registration Display System

Figure 2:
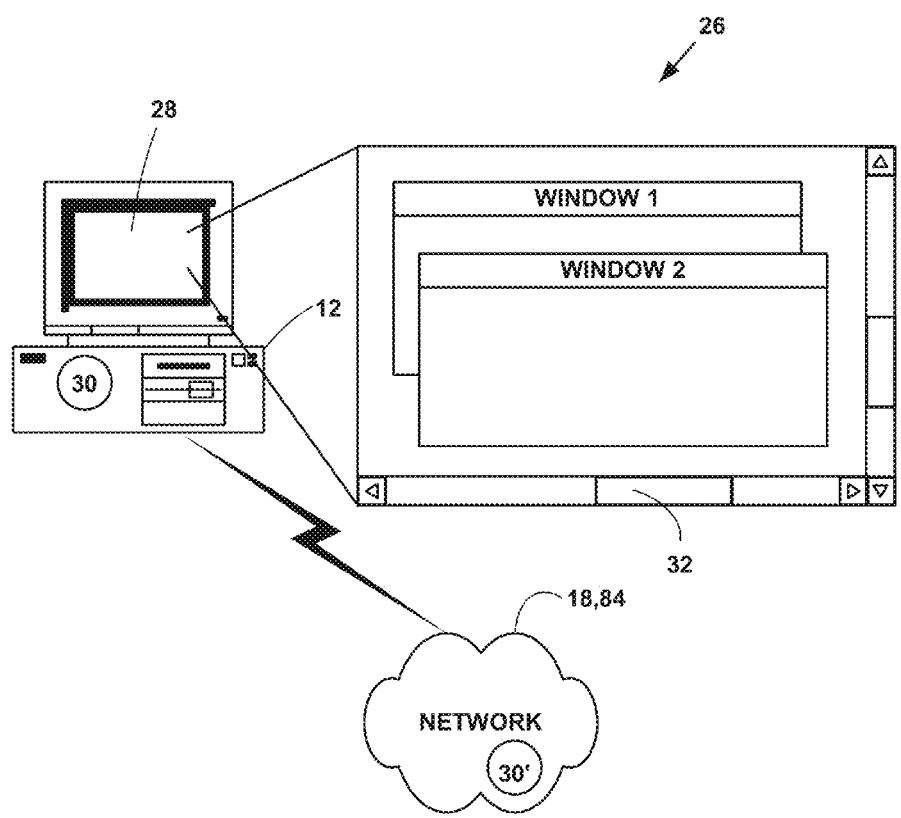
FIG. 2 is a block diagram illustrating an exemplary electronic document registration display system.

FIG. 2 is a block diagram illustrating an exemplary electronic document registration display system 26. The exemplary document registration display system 26 includes, but is not limited to a target device (e.g., 12) with a display 28. The target network devices 12, 14, 16 and server network devices 20, 22, 24 include a document registration application 30 that presents a graphical user interface (GUI) 32 on the display 28. The GUI 32 presents a multi-window interface to a user.

In one embodiment of the invention, the document registration application 30 is a cloud communications software application stored as plural instructions in a computer readable medium on the target network devices 12, 14, 16 and the server network devices 20, 22, 24 (labeled 30' on the server network devices). The plural instructions cause one or more processors on the devices to execute the cloud communications software application 30 from the non-transitory computer readable medium. However, the present invention is not limited to this embodiment and the cloud communications application 30 can include firmware, hardware or a combination thereof.

Automated Document Registration System

The electronic document registration system 10 includes an Automated Documentation Registration System (ADRS). Users of the Automated Document Registration System (ADRS) are referred to as Subscribers. Subscribers are divided into two types: (1) document Submitters; and (2) document Receivers.

A Subscriber account allows a user to act as both Submitter and Receiver for electronic documents. Submitting an electronic file including an original electronic document to the ADRS 10 is referred to in this document both as "Submit" and "Check-In."

The ADRS 10 records transaction events and establishes date/time stamps to securely register electronic files. The transaction events are performed in a redundant manner to increase reliability, decrease the possibility of error and also virtually eliminate the possibility of tampering, by a hacker for example, since multiple separate data sources would have to be modified in the same way at the same time to escape detection.

The checking-in, processing, sharing and receiving of files on the ADRS 10 is based on rules meant to protect the integrity of the Subscribers and their electronic data files. Some rules are fixed, system-wide, such as encrypted files are only viewable by the Submitter and by Subscribers the document was shared with. Some rules are established on a per file local basis, such as the grouping and sub-grouping of files, or the sharing of a file, which changes the viewing permission rules for the file. In effect, the rules define the actions of a unique virtual file system that is a component of the ADRS 10.

Figure 3B:
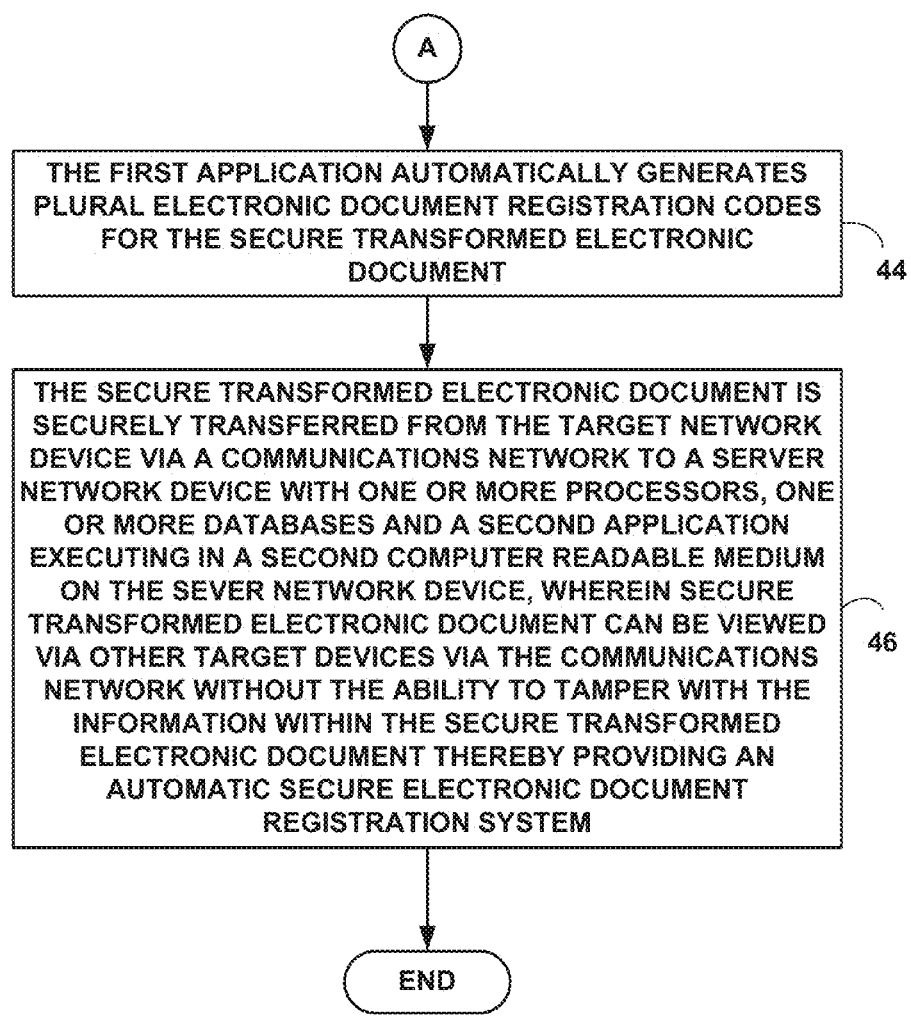

FIGS. 3A and 3B are a flow diagram illustrating a Method 34 for automatic electronic document registration. In FIG. 3A, at Step 36, an original electronic document is received via a first application stored in a computer readable medium on a target network device with one or more processors. At Step 38, the first application automatically applies a first set of electronic document registration rules to the original electronic document, thereby creating a first level modified electronic document. The first set of electronic document registration rules include document registration rules applied to all electronic document being registered via an automatic document registration system. At Step 40, a second set of electronic document registration rules is applied via the first application to the first level modified electronic document thereby creating a second level modified electronic document. The second set of electronic document registration rules include local document registration rules applied only via the application on the target network device. At Step 42, the second level modified electronic document is automatically transformed via the first application into a secure electronic document storage format using a pre-determined set of electronic document transformation rules thereby creating a secure transformed electronic document.

In FIG. 3B, at Step 44, the first application automatically generates plural electronic document registration codes for the secure transformed electronic document. The plural electronic document registration codes includes, but is not limited to, an unalterable date and time stamp, an identification code and one or more encryption codes. At Step 46, the secure transformed electronic document is securely transferred from the target network device via a communications network to a server network device with one or more processors, one or more databases and a second application executing in a second computer readable medium on the sever network device. The secure transformed electronic document can be securely viewed via other target devices via the communications network without the ability to tamper with the information within the secure transformed electronic document thereby providing an automatic secure electronic document registration system.

Method 34 is illustrated with one exemplary embodiment. However, the present invention is not limited to this embodiment and other embodiments can also be used to practice the invention.

In such an exemplary embodiment in FIG. 3A at Step 36, an original electronic document 11 is received via a first application 30 stored in a computer readable medium on a target network device 12, 14, 16 with one or more processors.

In one embodiment, the original electronic document includes a legal document (e.g., a contract, deed, title stock option grant, will, trust, etc.) and/or a non-legal document (e.g., a manuscript, etc.).

At Step 38, the first application 30 automatically applies a first set of electronic document registration rules to the original electronic document. The first set of electronic document registration rules include document registration rules applied to all original electronic documents being registered via the automatic document registration system 10 (i.e., is an application of a system wide set of rules), thereby creating a first level modified electronic document.

For example, the first set of electronic document registration rules may include rules to be applied for a file type (e.g., Microsoft Word, Portable Data Format (PDF), etc.) a type of encryption (e.g., DES, MD5, etc.), a type of file compression, etc.

In one embodiment, the first set of electronic document registration rules includes credential rules. In such an embodiment, at Step 38, credentials for a user of the target network device 12, 14, 16 are verified. In such an embodiment, the credentials are verified automatically based on a stored static user profile. In another embodiment, the credentials are verified automatically and dynamically by having a user enter a password, complete a biometric scan, etc. that is accepted on the first application 30. In another embodiment, the credentials are automatically read from a user profile file by application 30. However, the present invention is not limited to these embodiments and other embodiments may also be used to practice the invention.

At Step 40, a second set of electronic document registration rules is applied via the first application 30 to the first level modified electronic document thereby creating a second level modified electronic document. The second set of electronic document registration rules include local document registration rules applied only via the application on the target network device 12, 14, 16 (i.e., is an application of a local set of rules).

For example, the second set of electronic document registration rules may include a file type (e.g., Microsoft Word, Portable Data Format (PDF), etc.) a type of file compression, a display type (e.g. type of graphical window, font color, font size, etc.) etc. set up and used only the target device 12, 14, 16.

In one embodiment, steps 38 and 40 are accomplished by automatically applying the first and second set of rules stored in a document profile stored in the computer readable medium on the target network device 12, 14, 16.

Figure 4:
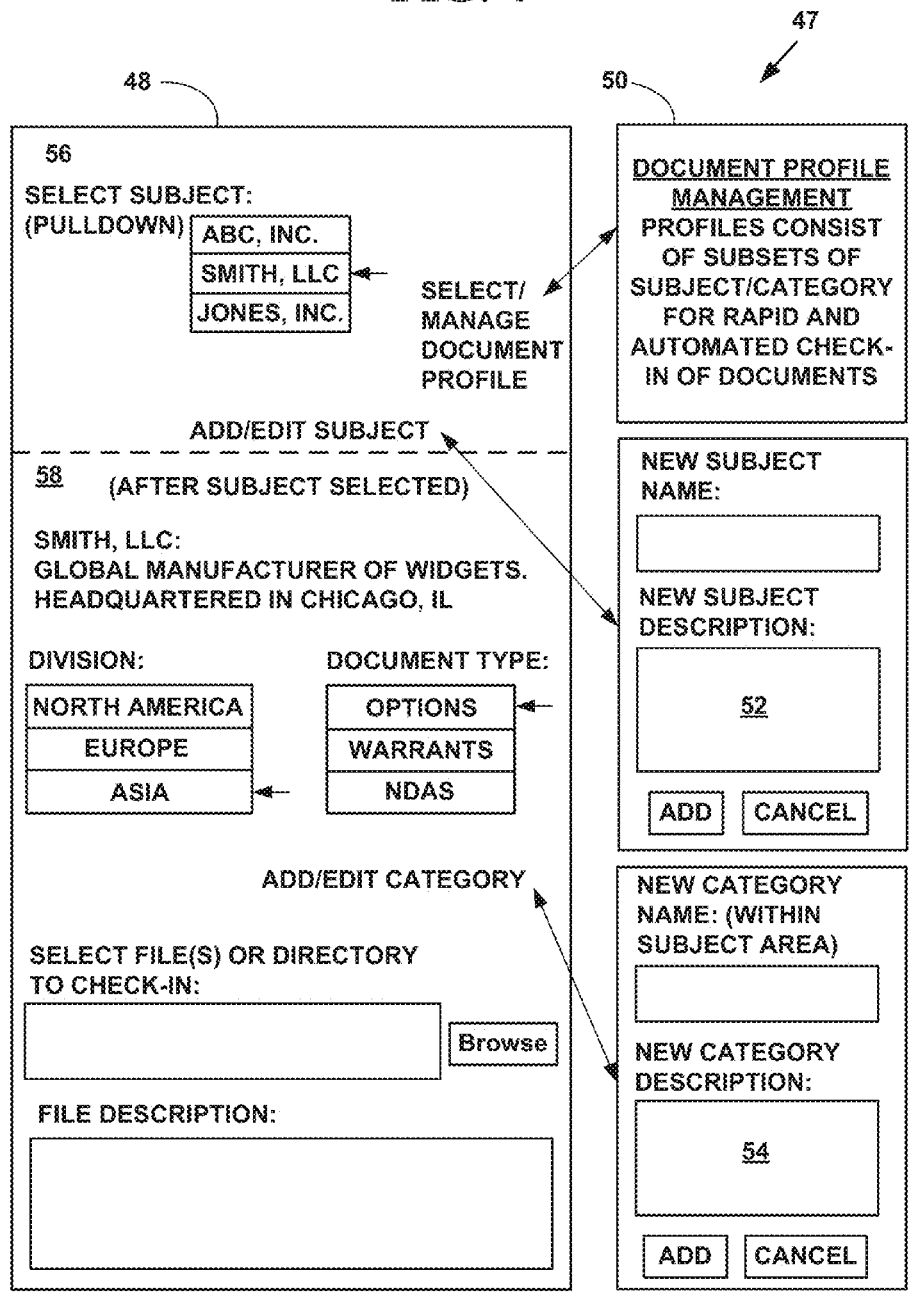
FIG. 4 is a block diagram illustrating an exemplary automatic electronic document registration check-in screen.

FIG. 4 is a block diagram 47 illustrating an exemplary automatic electronic document registration check-in screen 48. The document check-in screen 48 is displayed in one or more graphical windows on GUI 32 (FIG. 2).

FIG. 4 graphically illustrates an embodiment of displaying established organizational rules from a document profile 50 for a pre-determined association of files into a pre-determined structure of security groups and security sub-groups for storing, sharing and retrieving electronic documents. In one embodiment, the pre-determined structured for the security groups and sub-groups includes a security hierarchy with plural levels, wherein each level includes its own set of security rules and permissions, (e.g., write, read, view alter, etc.) as part of a virtual matrixed file system.

The organization of stored files into security groups and security sub-groups is similar to the use of directories and subdirectories in a file system but can be virtually overlayed to provide different views for different users. In one embodiment, a single file can reside in plural pre-determined security groups and sub-groups at the same time but only in one pre-determined file association. In another embodiment a single file can reside in plural file associations and plural security groups and sub-groups at a same time. In one embodiment, the association of files into groups and sub-groups include the centralized database model using LDAP described above. However, the present invention is not limited to such an embodiment and other embodiments may also be used to practice the invention.

In one embodiment, the one or more databases 20' 22' 24' associated with the server network devices 20, 22, 24 form a virtual file system that creates a virtual matrixed directory structure by establishing file accesses based on assigning secure transformed electronic files to any number of security groups and security sub-groups and any number of viewing groups and sub-groups instead of designating the files to directories and subdirectories in the virtual file system. The virtual matrixed directory structure can be overlaid to plural viewers and/or auditors who have permission to view a Sharing subscriber's securely transformed electronic documents using the various security groups and sub-groups and viewing groups and sub-groups.

The sharing of files based on the security groups and security sub-groups of that matrix adds a layer to the virtualness, as subsets of a Sharing Subscriber's virtual directory matrix are overlaid on the Receiving Subscriber's virtual directory, with the possibility of multiple Receiving Subscribers each having a unique virtual view of multiple Sharing Subscribers' virtual directories.

The system 10 described herein has an additional advantage of including a description component 52, 54 at each security group and sub-group level. The organizational description components automatically provide a significant amount of description for an electronic document to be securely registered. The security group and sub-group descriptions, combined with the individual file description that the user is allowed to enter, provide a high degree of description for each file, while minimizing the per-file description efforts.

As is illustrated in FIG. 4, At the top of the screen, there is a top-level security grouping level called Subject 56, and below that is a security sub-group level called Category 58. Subject 56 and category 58 are use as group and sub-group terms in this description.

To the right of the page are three sub-screens that are used to manage grouping Profiles, groups (Subjects), and sub-groups (Categories). The user can add whatever subject and categories are suitable for their organization. Each subject and category can be given a description, which is inherited by each document that is associated with them.

In one embodiment user Profiles are comprised of pre-defined subsets of security group/sub-group combinations. Profiles ease the process for Subscribers of organizing files to be Checked-In and can be configured into an automated or automatic Check-In process that can reduce or eliminate the user's involvement and intervention in the process to apply local rules and system-wide rules from the first set and second set of document registration rules.

To Check-In an electronic document stored in a file or plural files, a User selects a Profile and/or a set of Subjects and Categories to be associated with the file(s) that are automatically registered via Method 34. In one embodiment, the User pre-selects the Profile for use by Method 34. In another embodiment, a default Profile is used. In another embodiment, a graphical screen (e.g., 48, etc.) is displayed so a user can manually select or re-select a Profile. However, the present invention is not limited to these embodiments and other embodiments can also be used to practice the invention.

In FIG. 4, at the bottom of the example screen there is also an area shown where the User can indicate original electronic file(s) or whole directory(s) of original electronic files to be uploaded from their local system. Then User may enter an individual description for the file(s) to be uploaded. This embodiment provides the User with a high degree of flexibility in organizing and describing documents for storage, retrieval and sharing of automatically registered electronic documents.

At Step 42, the second level modified electronic document is automatically transformed via the first application 30 into a secure electronic document storage format using a pre-determined set of electronic document transformation rules thereby creating a secure transformed electronic document. The secure transformed electronic document includes an encrypted and not viewable format, a message digest or hashed not view able format, a read-only viewable format, a digital image format, a portable data format (PDF) and other types of transformed formats that are viewable and/or not viewable. The encryption includes private encryption with private only encryption keys and public/private key encryption.

Step 42 includes processing the second level modified electronic document for protection and identification of Checked-In file. Different embodiments use one or more or all of the following techniques illustrated in Table 1. In some cases, the embodiment could depending on the file type; for example, word processing files, are treated differently than non-visual data files such as audio, video, graphical, files etc. In one embodiment, selected ones of the techniques in Table 1 are used via application 30. In another embodiment, all techniques listed in Table 1 are used via application 30 (and/or 30').

TABLE 1

A biometric 21 may generated to create an ability to verify that a processed file is identical to an original file Checked-In to the ADRS 10.
A search index may be generated for the file to assist Subscribers in locating it on the ADRS 10.
If the Checked-In file is a newer version of a previously Checked-In file, document versioning processing is applied.
An automated description information generation process may be applied to the file.
A digital watermark for identification purposes may be generated and applied to a copy of the processed file, with the original file remaining undisturbed.
A document transformation process may be applied to create, for example, an image format of a word processing document that is available for viewing only. The original file would remain undisturbed.
A micro-encoding process for identification purposes may be applied to a copy of the processing file, with the original file remaining undisturbed.
The original copy of the file, and any facsimile copies created by file processing, are encrypted and stored in the encrypted format. Encrypted files can only be decrypted for viewing by the Submitter and by approved Receivers.

The processing data, file information and files generated during the processing step will be associated with the file and stored in the ADRS 10.

In FIG. 3B at Step 44, the first application automatically generates plural electronic document registration codes for the secure transformed electronic document The plural electronic document registration codes include, but are not limited to, an unalterable date and time stamp, an identification code and one or more encryption codes.

Figure 5:
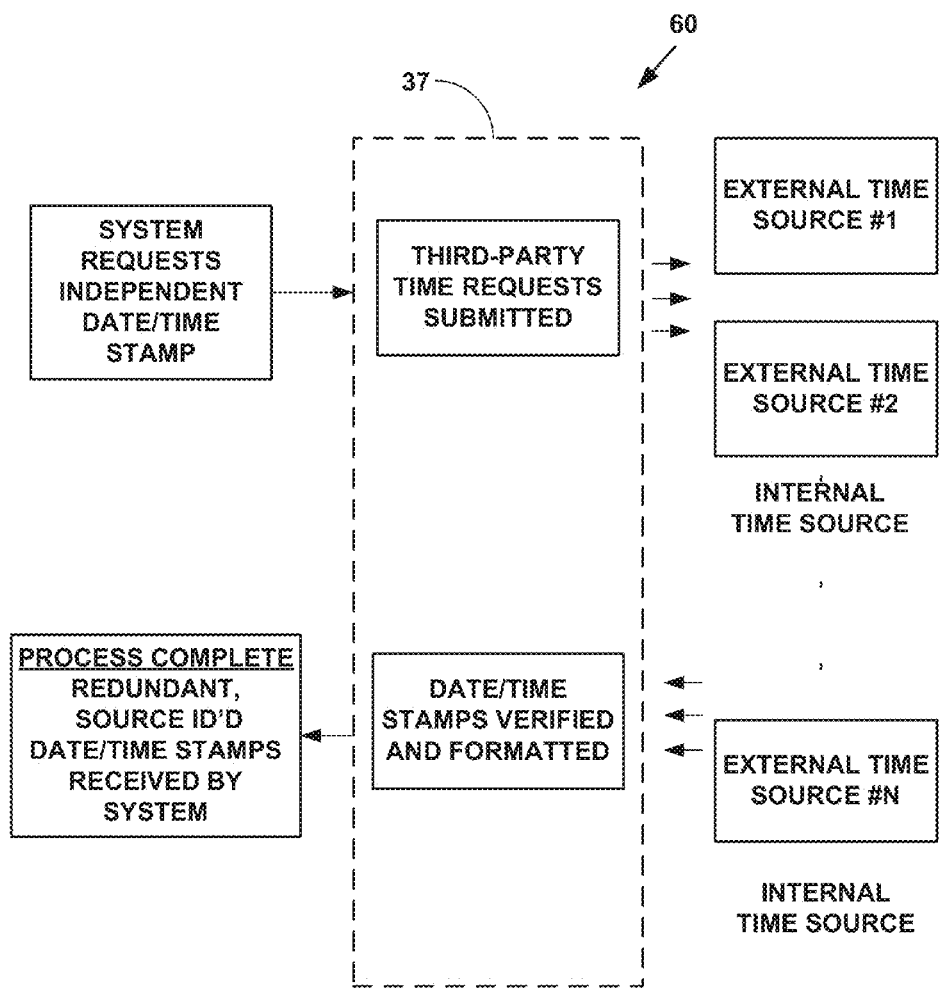
FIG. 5 is a block diagram illustrating a date/time subsystem.

FIG. 5 is a block diagram 60 illustrating a date/time subsystem 37 used within application 30.

In one embodiment, the date and time stamp is securely obtained from a trusted external third-party data/time stamp system 17. For example, the data and time stamp may be obtained from an interface to system providing International Atomic Time (IAT). IAT is a high-precision atomic coordinate time standard based on the notional passage of proper time on Earth's geoid. It is the principal realization of Terrestrial Time, and the basis for Coordinated Universal Time (UTC) which is used for civil timekeeping all over the Earth's surface. However, the present invention is not limited to this embodiment, and other date/time systems can also be used to practice the invention.

The third-party date/time stamp subsystem 17 provides a highly redundant, highly reliable method of file time verification. The ADRS 10 employs this method because basing the date/time stamp on the local computer system time would make the ADRS potentially unreliable because of the possibility of tampering or error, and the use of a single external time source introduces the possibility of an inaccurate or missing date/time stamp as a result of system outage, system error, network outage, or network delay ADRS modules in application 30 that perform file transactions, such as file check-in, re-classification, sharing, or other transaction, make requests from this external date time subsystem 60.

When a date/time stamp is requested by a ADRS 10 application 30 module, it submits requests to a number of objective external time server sources (such as those operated by the National Institute of Standards and Technology, the Naval Observatory, the Greenwich Observatory, or the like). The date/time stamp information is received from the external sources by this subsystem. This subsystem associates each of the external time results with their respective sources and returns the information to the requesting module.

In one embodiment, results from all sources are returned to the requesting module in application 30. In another implementation, the date/time stamp subsystem 60 provides some level of intelligence to determine a single time result from the multiple results. For example, if four sources produce an identical time and a fifth disagrees, this subsystem 60 establishes the time produced by the majority as a single, official time for that transaction, etc.

In another embodiment, the date and time stamp is securely obtained from a trusted internal data/time stamp system 17. For example, reliable secure internal time servers are commercially available for time stamping, auditing, authentication protocols, and file/data logs. Spectracom's NetClock is an example of such one such commercial date/time system. Netclock provides a secure internal time and date server. Spectracom NetClock systems are based on Global Position System (GPS) technology with Legally Traceable Time, a precise timestamp determined tracking up to twelve satellites simultaneously and synchronizing to the satellites atomic clocks. This provides a direct traceability path to national and international standards. However, the present invention is not limited to this embodiment, and other external, internal, commercial and private date/time systems can also be used to practice the invention.

In one embodiment, a copy of the date/time stamp is encrypted with an encryption key only known to application 30 on the target device. A copy of the encrypted date/time stamp is included with the secure transformed electronic document 13 as an additional security safeguard backup. However, the present invention is not limited to this embodiment, and embodiments can also be used to practice the invention and the date/time stamp need not be encrypted and/or stored on the secure transformed electronic document.

In one embodiment, a user biometric collected from a user of the target network device is encrypted with an encryption key only know to application 30 on the target device. A copy of the encrypted user biometric is included with the secure transformed electronic document 13 as an additional security safeguard backup. For example, on the identical user that created the user biometric would be allowed to access the secure transformed electronic document. However, the present invention is not limited to this embodiment, and embodiments can also be used to practice the invention and the user biometric need not be encrypted and/or stored on the secure transformed electronic document.

In one embodiment, the ADRS 10 generates a globally network unique sequence number and a document identifier for each file. The globally unique sequence number is a unique number based on all files on the ADRS 10.

In one embodiment, the globally unique sequence number is, for example, a Universally Unique Identifier (UUID) that is an identifier standard used in software construction, standardized by the Open Software Foundation that is globally unique across time and space.

As is known in the software arts, UUIDs are documented as part of ISO/IEC 11578:1996 "Information technology—Open Systems Interconnection—Remote Procedure Call (RPC)" and more recently in ITU-T Rec. X.667, ISO/IEC 9834-8:2005. The IETF has published Proposed Standard RFC 4122 that is technically equivalent with ITU-T Rec. X.667, ISO/IEC 9834-8 the contents of all of which are incorporated by reference.

In another embodiment, the globally network unique sequence number includes a software identifier, as well as a hardware identifier (e.g., a TCP/UCP port, an IP address, a MAC address, a network card identifier, etc.).

However, the present invention is not limited to the globally network unique sequence numbers described and other types of globally network unique sequence numbers can also be used to practice the invention.

In one embodiment, the document identifier is a unique ADRS system 10 identifier that is a set of alphabetic and numeric characters that includes certain coded organizational information in it. However, the present invention is not limited to the document identifiers described and other types of document identifiers can also be used to practice the invention. For example, a user identifier, a site identifier a year identifier, a document identifier, etc. (e.g., john-smith-boston 1-2009-123AF4567, etc.).

In one embodiment, the one or more encryption codes include, but are not limited to, public/private encryption keys, a type of encryption (e.g., AES, DES, MD5), a type of secure communications (e.g., SSL, TLS, etc.), message digest codes, secure hash codes, etc.

Figure 6:
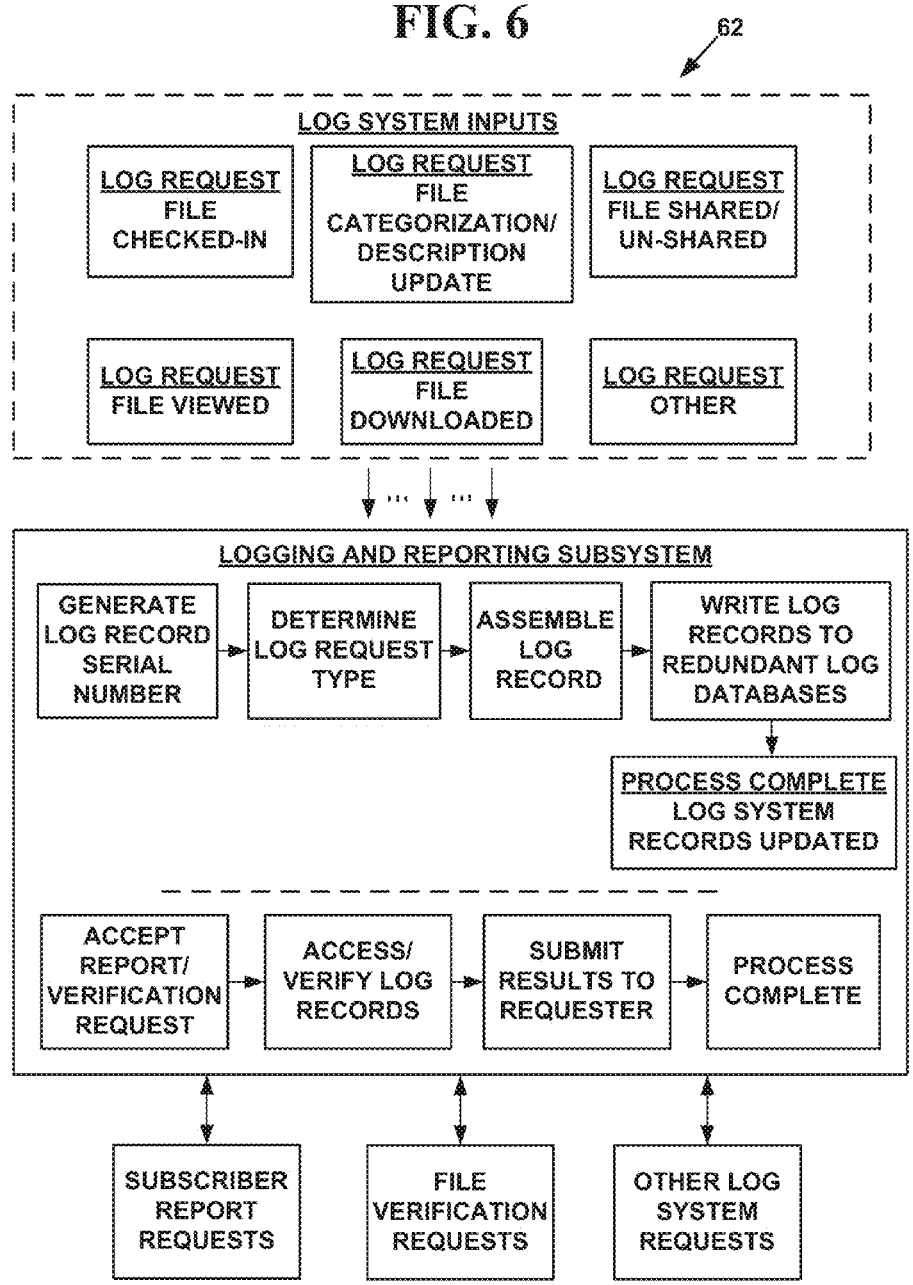
FIG. 6 is a block diagram illustrating an exemplary logging and reporting system

FIG. 6 is a block diagram 62 illustrating an exemplary logging and reporting sub-system used within application 30.

The logging and reporting sub-system 62 provides a highly redundant, highly reliable method of tracking and verifying all file transactions executed by the ADRS 10. It allows Subscribers to review a detailed transaction history for individual documents, or to generate reports detailing all aspects of Submitting, Sharing and Receiving files on the ADRS 10.

The ADRS 10 employs redundancy in transaction recording to provide a higher level of assurance regarding the integrity of the ADRS to subscribers. In one specific exemplary embodiment, each automatic electronic document registration transaction is assigned a sequential serial number, which fixes it within the timeframe of the preceding and succeeding transactions. In addition, the file transaction records are written to multiple locations on multiple server network devices 20, 22, 24. The system has the ability to verify the transaction records from multiple sources to detect errors and guard against potential hacking or tampering of any kind that would compromise the integrity of the system 10. File transaction requests are received by this subsystem from the ADRS 10 application 30 modules that control the file transactions.

In one embodiment, when a transaction logging request is submitted to the subsystem 62, a serial identification number is requested. Based on the type of transaction being logged, a transaction log record is assembled. That record is then written to redundant databases 20', 22', 24' and the information is make available to the ADRS 10 for reports and verification.

In one embodiment, a date/time stamp is requested by this subsystem 62 from the date/time subsystem 60. In another implementation, the date/time stamp used is provided by the requesting module, as the requesting module would have the most accurate time with regard to transactions such as file uploading. In another embodiment, the logging module and the reporting module both independently request a date/time stamp from the date/time subsystem 60. In another embodiment, transaction logging redundancy is implemented, in another it is not. However, the present invention is not limited to the these embodiment and other embodiments can also be used to practice the invention.

In one specific exemplary embodiment, when the file processing is completed at Step 46, the Logging and Reporting Subsystem 60 within application 30 of the ADRS 10 is called to record the ADRS transactions completed with regard to this file. The Logging and Reporting Subsystem 60 is used in part when a User pays a fee to use ADRS 10. However, the present invention is not limited to the this embodiment and the ADRS 10 can be used without payment or recording or checking of any fees for use.

In one embodiment, before making the transformed electronic document 13 available for use in the ADRS 10, the Subscriber's file count and disk usage are compared to their current subscription plan and payment status. Depending on the embodiment, if additional payment is required, this could result in a request for payment being generated, or it could result in the updating of the data to be used to generate the Subscriber's regular invoice. Once the Subscriber's usage and billing status has been verified, the registered file is made available to the Subscriber for viewing and sharing.

Figure 7:
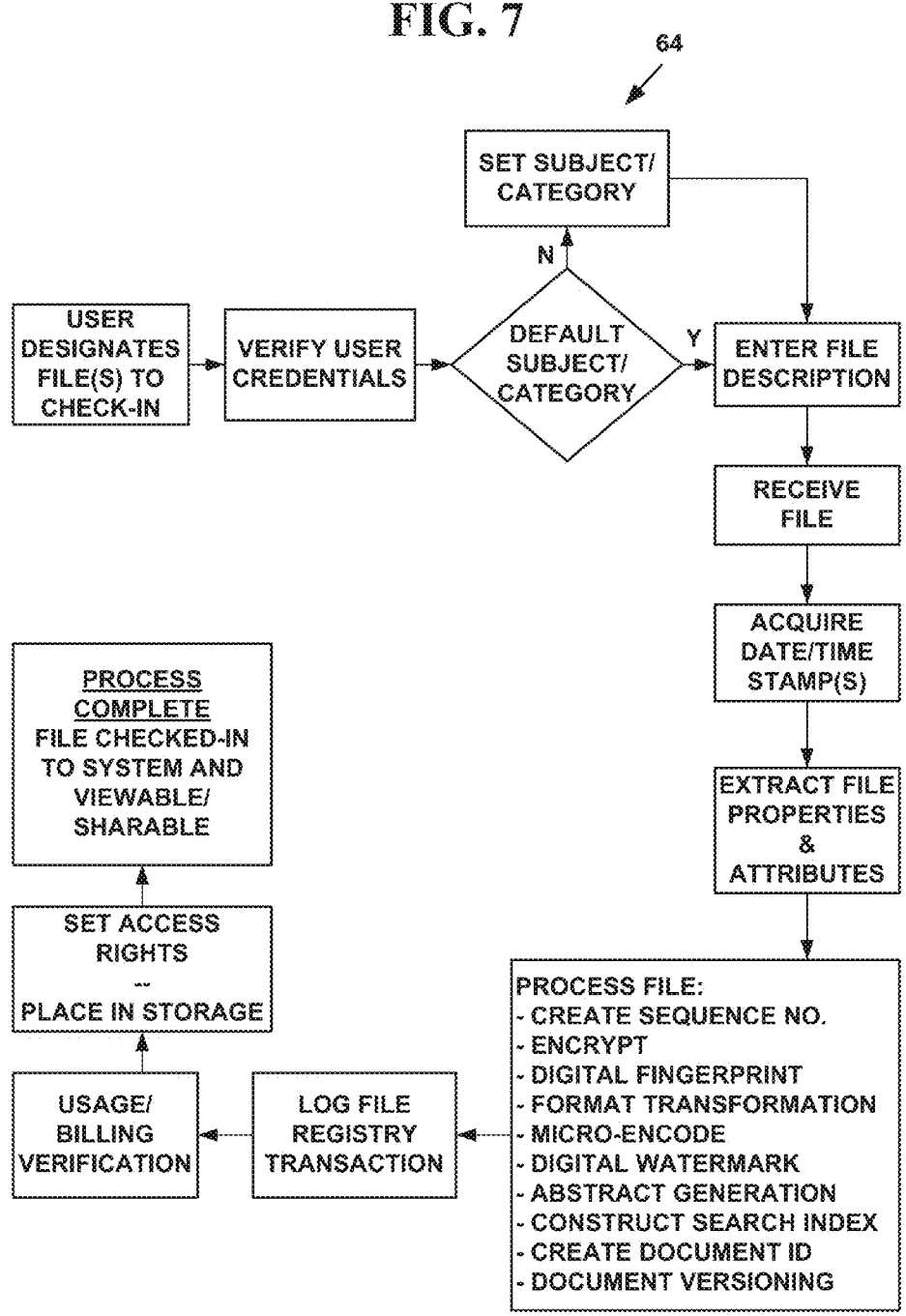
FIG. 7 is a data flow diagram illustrating data flow details of the method of FIG. 3.

FIG. 7 is a data flow diagram 64 illustrating data flow details of Method 34 of FIG. 3.

Returning to FIG. 3B, at Step 46, the secure transformed electronic document 13 is securely transferred (e.g., sent via encrypted, hashed, message digested, SSLed, TLSed, etc.) from the target network device (e.g., 12, etc.) via a communications network 18 to a server network device 20, 22, 24 with one or more processors, one or more databases and a second application 30' executing in a second computer readable medium on the sever network device 20, 22, 24. The secure transformed electronic document 13 can be viewed via other target devices 14, 16 via the communications network 18 without the ability to tamper with the information within the secure transformed electronic document 13 thereby providing an automatic secure electronic document registration system 10. In one embodiment, the application 30 on the target network device 12, 14, 16, also securely transfers the original electronic document from the target network device 12, 14, 16 to the server network device 20, 22, 24 for storage in the databases 20', 22' 24'.

Subscribers who submit files to the ADRS 10 via Method 34 may have a need to edit a file that has been previously submitted. The ADRS 10 allows the editing or modification of any file because the original file is always retained on the ADRS 10.

Figure 8:
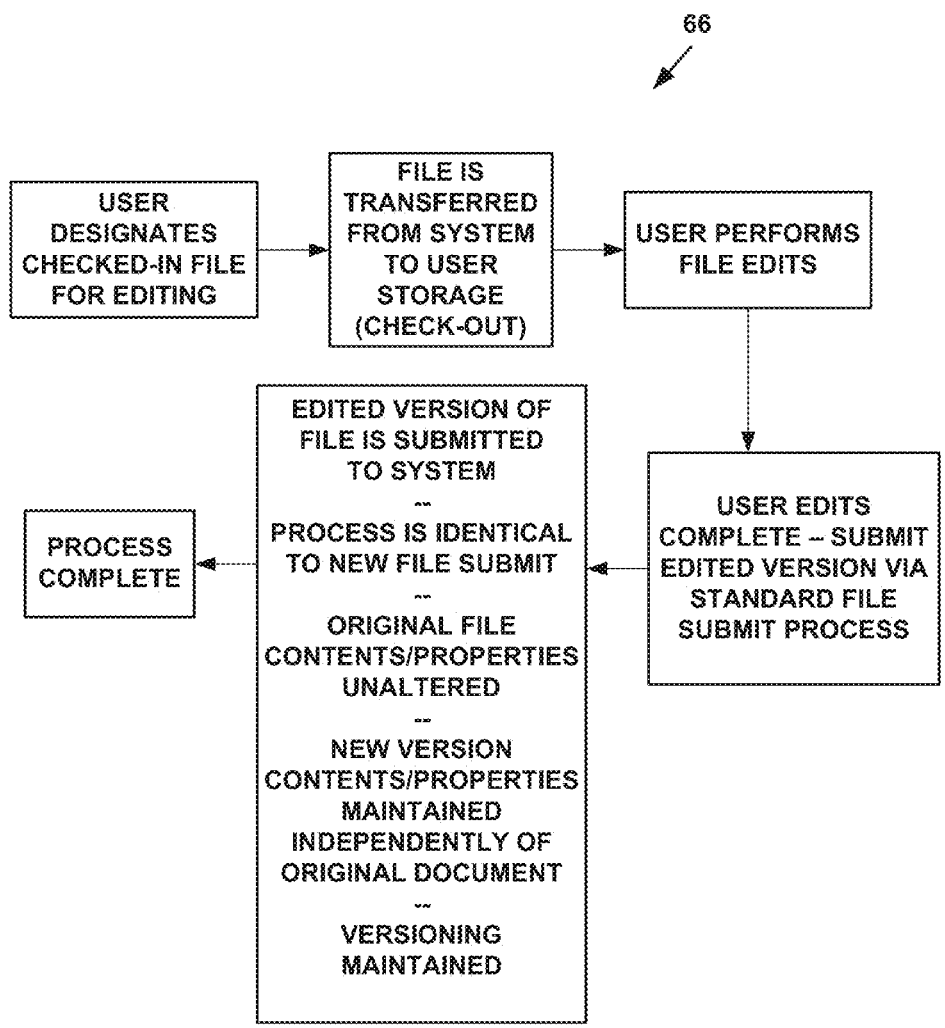
FIG. 8 is a data flow diagram illustrating data flow details for editing files that have been processed using the method of FIG. 3.

FIG. 8 is a data flow diagram 66 illustrating a data flow for editing files that have been processed using Method 34.

Figure 9:
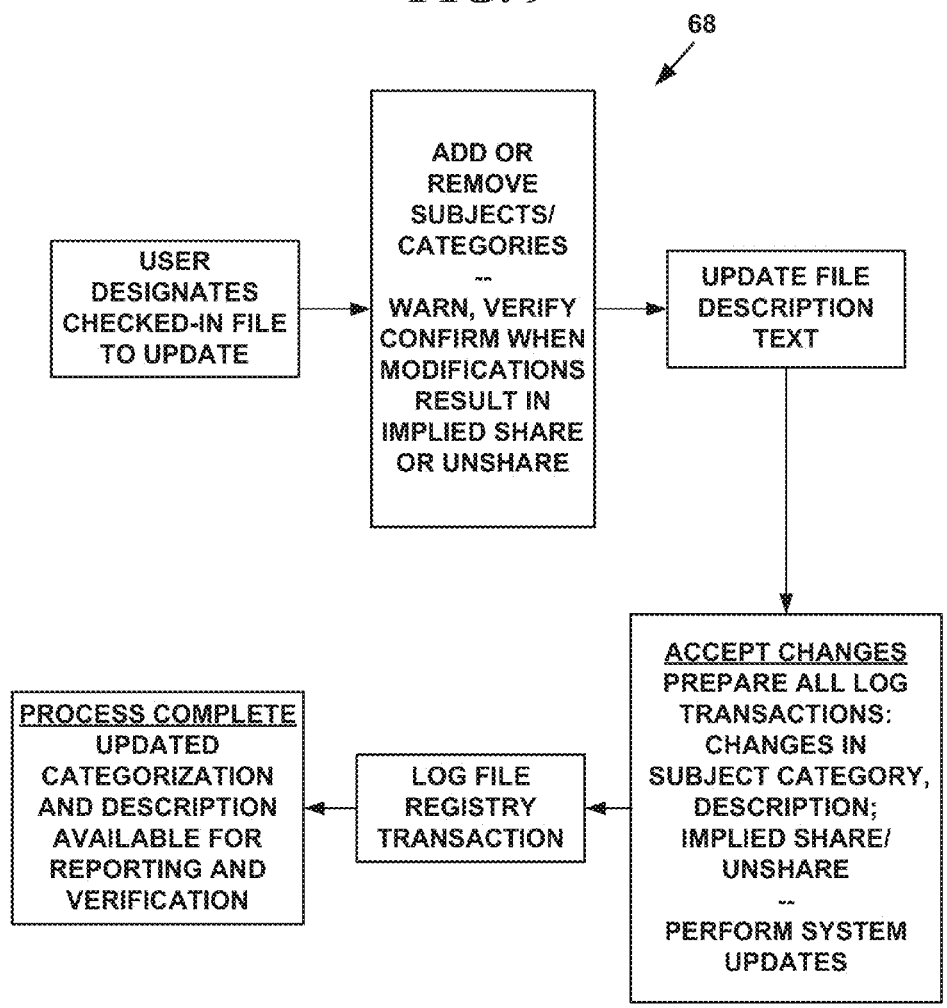
FIG. 9 is data flow diagram illustrating a data flow for user updates of file information that have been processed using method of FIG. 3.

FIG. 9 is data flow diagram 68 illustrating a data flow for user updates of file information that have been processed using Method 34.

The Subscriber can designate a Checked-In file for editing. The Subscriber would then initiate a download or transfer of that file to a target network device 12, 14, 16 under their control. The Subscriber may perform any number of edits over any timeframe, without restriction from the ADRS 10.

When the Subscriber has completed the editing process, the edited version of the file must be Checked-In to the ADRS following Method 34. The original electronics file's contents, properties, classifications and description are not modified in any way by the ADRS 10. The new file's contents, properties, classifications and descriptions are maintained independently of the original file. The only distinction made by the ADRS 10 at Check-In using Method 34 between a completely new file and a file that has been Checked-Out and edited is with regard to its file version. In one embodiment of the system, file deletion is not allowed on the ADRS 10, thereby providing permanent recording of electronic documents and their associated files. In another embodiment, the ADRS 10 allows files to be deleted.

As was discussed above, when a file is Checked-In to the ADRS 10, the Subscriber can manually and/or automatically via Profile assign subjects, categories and descriptions to it. The ADRS 10 allows Subscribers to update these file characteristics without compromising the integrity of the original file itself or its unalterable date/time stamp.

The Subscriber can designate a Checked-In file to update. The Subscriber may then, as desired, remove subjects and categories, or add them in a similar method as performed when the file is checked in. Since it is possible to share all documents with a given subject or category, when the Subscriber tries to add or delete a subject or category that would alter the shared/unshared status of a file the ADRS 10 notifies the Subscriber as appropriate. A particular action may be prohibited by the configuration rules, or the action may require the Subscriber to confirm the share/unshare transactions implied by the change. The Subscriber may also update the file description, etc.

In one embodiment, during an Accept Changes step, before the ADRS 10 update step is completed, the original subject, category and description values are saved and included with the transaction log request, along with all implied share/unshare transactions to be logged. In this way, the ADRS 10 maintains a detailed history record ensure the integrity of all files and file transactions for its Subscribers.

In one embodiment of the ADRS 10, updating the subjects, classifications and description of a file may not be modified after the file has been Checked-In. In another embodiment, the file descriptive components of the file may be modified after Check-In.

Viewing Secure Transformed Electronic Documents

Figure 10:
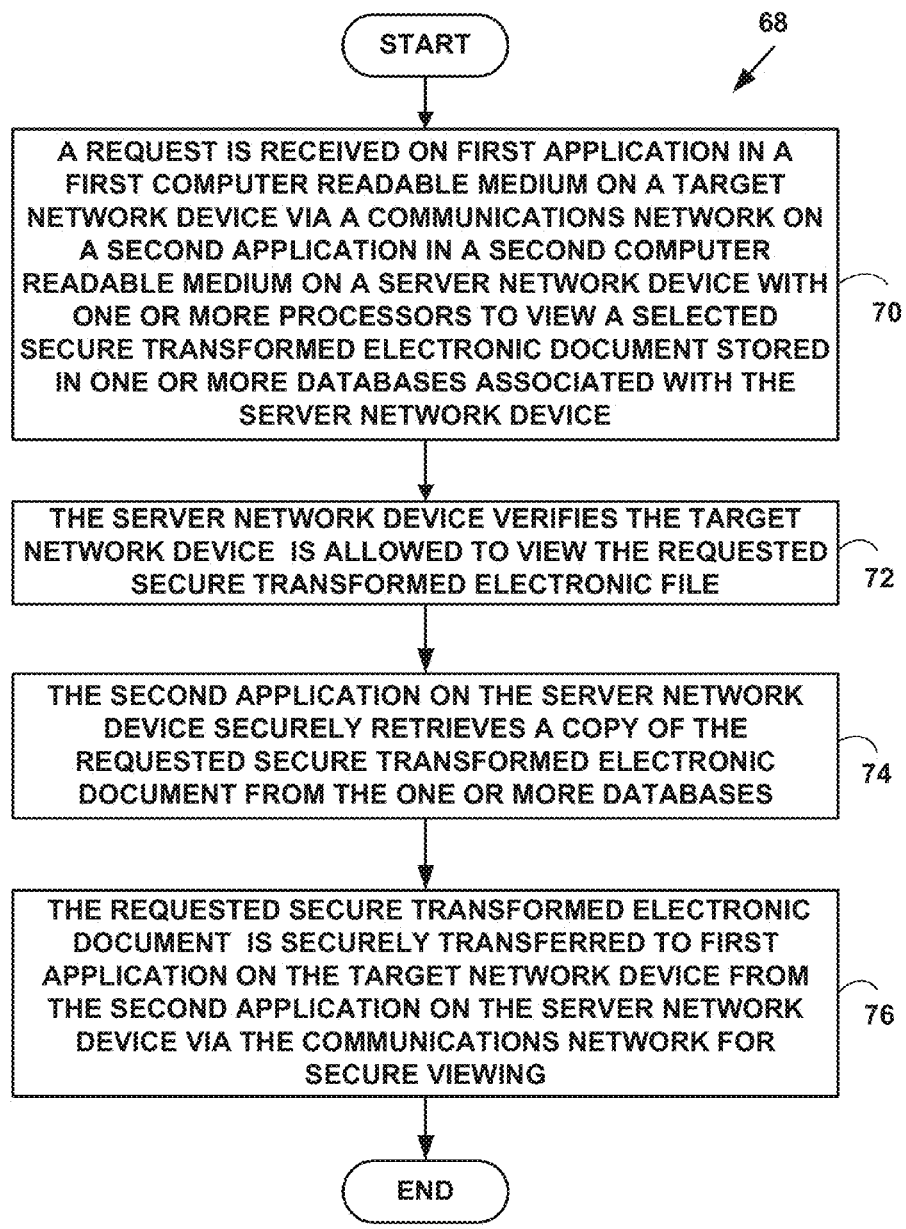
FIG. 10 is a flow diagram illustrating a method for viewing secure transformed electronic documents transformed with method of FIG. 3.

FIG. 10 is a flow diagram illustrating a Method 68 for viewing secure transformed electronic documents transformed with Method 34. At Step 70, a request is received via a communications network from a first application in a first computer readable medium on a target network device on a second application in a second computer readable medium on a server network device with one or more processors to view a secure transformed electronic document stored in one or more databases associated with the server network device. At Step 72, the server network device verifies the first application on the target network device is allowed to view the requested secure transformed electronic document. At Step 74, the server network device securely retrieves a copy of the requested secure transformed electronic document from the one or more databases. At Step 76, the requested document is securely transferred to first application on the target network device from the second application on the server network device for secure viewing.

Method 68 is illustrated with one exemplary embodiment. However, the present invention is not limited to this embodiment and other embodiments can also be used to practice the invention.

In such an exemplary embodiment in FIG. 10 at Step 70, a request is received via a communications network 18 from a first application 30 in a first computer readable medium on a target network device 12, 14, 16 on a second application 30' in a second computer readable medium on a server network device 20, 22, 24 with one or more processors to view a secure transformed electronic document 13 stored in one or more databases 20', 22' 24' associated with the server network device 20, 22, 24. The secure transformed electronic document 13 is transformed from an original electronic file using Method 34.

At Step 72, the server network device 20, 22, 24 verifies the first application on the target network device 12, 14, 16 is allowed to view the requested secure transformed electronic file 13 as was discussed above.

The ADRS 10 provides secure, time-verified document access between two entities (e.g., 12, 14 16 and 20, 22, 24). On the ADRS 10 the sharing and receiving entities are referred to as Subscribers. Entities that are not verified ADRS 10 Subscribers will not have access to the system 10, and therefore will not be able to Submit, Share or Receive files as described herein.

Figure 11:
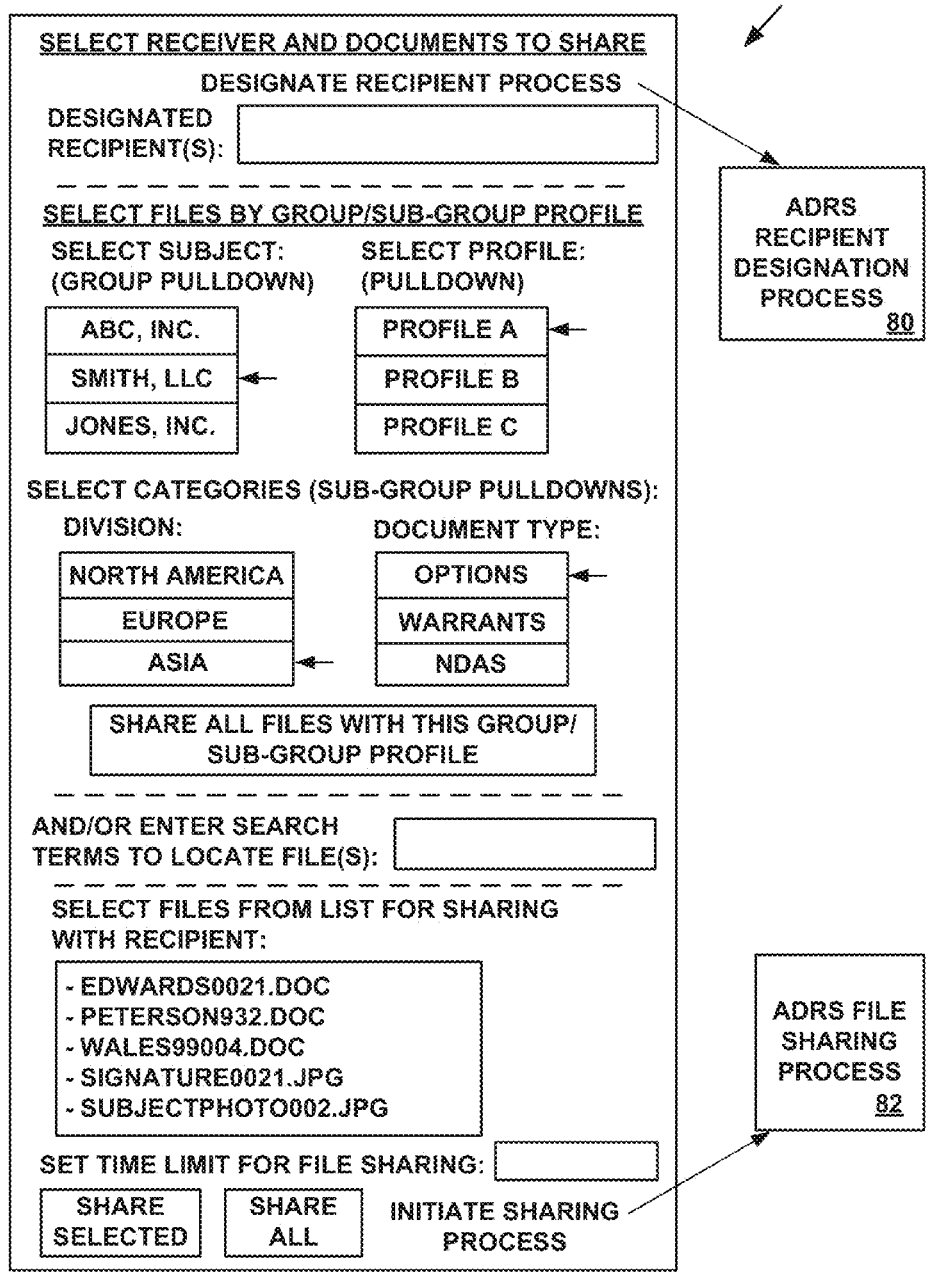
FIG. 11 is a block diagram illustrating an exemplary automatic electronic document registration document sharing screen.

FIG. 11 is a block diagram illustrating an exemplary automatic electronic document registration document sharing screen 78.

Figure 12:
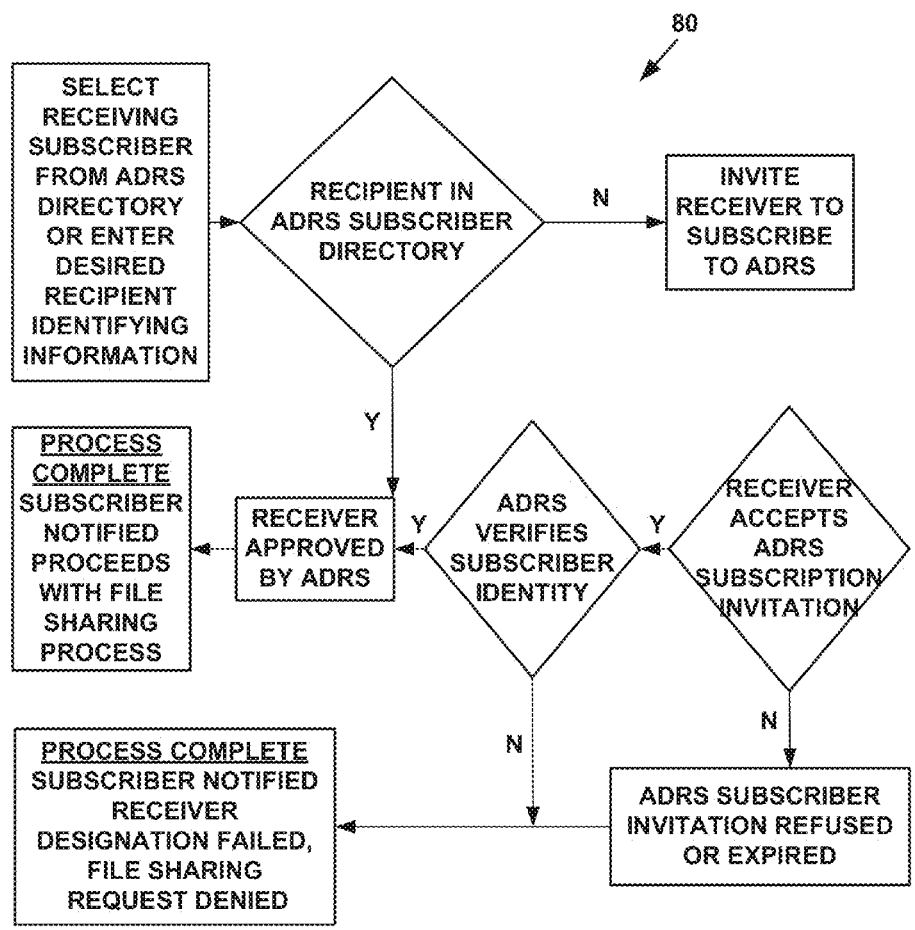
FIG. 12 is a data flow diagram illustrating an exemplary file receipt designation process.

FIG. 12 is a data flow diagram illustrating an exemplary file receipt designation process 80.

In one embodiment, in order to Share file(s) with another Subscriber, the Sharing Subscriber either selects a verified subscriber from the ADRS 1-directory, or enters sufficient identifying information (e.g.: name, email address, organization name, address, website, etc). The ADRS 10 then first attempts to identify a matching Subscriber in an ADRS 10 directory 20', 22', 24' and provide that Subscriber to the Sharing Subscriber for acceptance with a file receipt designation process 80 (FIG. 12).

If the intended Receiver accepts the invitation to become a Subscriber, and is verified by the ADRS 10, the Sharing Subscriber is notified that the Receiving Subscriber has been verified. If the intended Receiver declines the Subscription invitation to ADRS 10, or if the invitation expires, or if an attempt to subscribe was made, but the ADRS 10 could not verify, the file Sharing request will be denied. In one embodiment, the ADRS permits Subscribers to have private (non-viewable by other Subscribers) directory entries, in another embodiment it will not. In one embodiment, The System Logging and Reporting Sub-system 60 of application 30 is called to record all key transactions that take place during the ADRS 10 recipient designation process 80.

Figure 13:
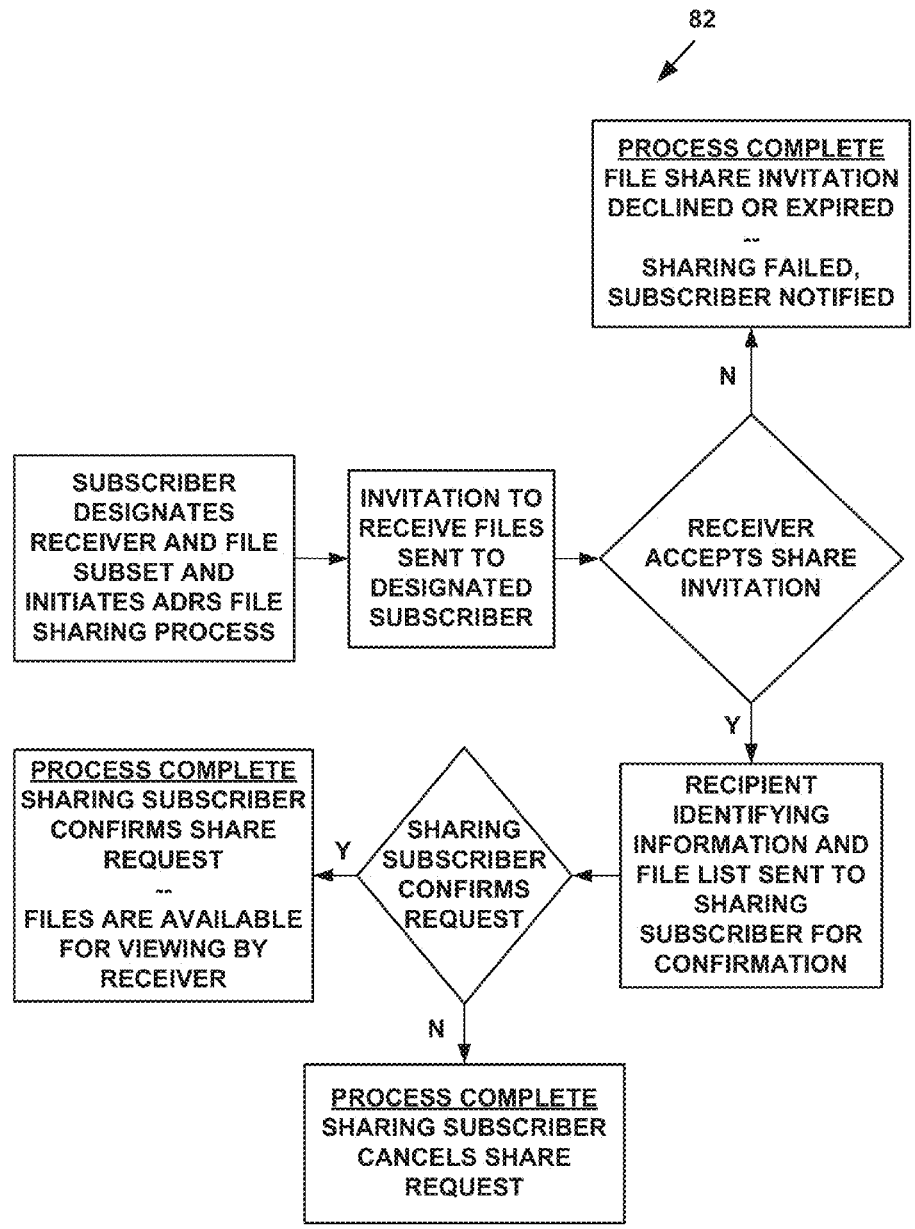
FIG. 13 is a data flow diagram illustrating and exemplary file sharing process.

If the intended Receiver is not in the ADRS 10 directory, they will be notified of the attempt to share files with them, and they are invited to become ADRS 10 Subscribers via a file sharing process 82 (FIG. 13).

FIG. 13 is a data flow diagram 82 illustrating and exemplary file sharing process 82.

In one embodiment, when the Sharing Subscriber has selected a verified Receiver and created a file list, they then initiate the ADRS 10 file sharing process 82. As with the other ADRS 10 processes, it is designed with redundancy and confirmation of action to achieve the purpose of secure, reliable sharing of time-verified file information between two approved Subscribers.

When the file sharing process 82 is initiated, the ADRS sends an invitation to the Designated Subscriber to accept Receipt of the shared files. If the Designated Subscriber declines the Share invitation, or the invitation expires, the Share operation fails and the Sharing Subscriber is notified. If the Receiver accepts the invitation, their identifying information and the list of shared files is sent back to the Sharing Subscriber for confirmation before the files become available to the Receiver.

This is a safeguard step for the protection of the Subscribers and the sensitive information that they will store on the ADRS 10 The Sharing Subscriber has the ability to cancel their own Share request upon review of the Receiving Subscriber's acceptance notification. The Sharing Subscriber might notice some files in the list that don't belong there; perhaps two Subscribers have similar names and they accidentally selected the wrong one; perhaps they absent-mindedly entered another subscriber that they have dealings with, but who should not have access to the files. The Sharing Subscriber's specific reasoning for canceling their own Share request is not important, but the value provided to Subscribers by this embodiment of the invention is clear.

If the Sharing Subscriber accepts the Share confirmation message from the ADRS 10, the files will then appear in the Receiving Subscriber's file list. As approved Receiver, the Shared documents will decrypt for viewing on demand by Receiver. The Receiving Subscriber will be able to verify the contents of the file as of the date/time stamp established by the ADRS as of the time that the file was Checked-In.

In one embodiment, the file Un-Share process is relatively simple, as it is based only on a decision by the Sharing Subscriber to terminate the viewing rights of the Receiving Subscriber. In this case, the Sharing Subscriber updates the sharing rights for the and the process is complete. An optional step would allow the Sharing Subscriber to notify the Receiving Subscriber of this action.

In another embodiment of the ADRS 10, the Un-Sharing of documents may require approval of the Receiving Subscriber, or may not be allowed at all in certain defined cases. There are many possible reasons for creating this type of file sharing relationship between the Sharing and Receiving Subscribers. For example, there could be a mutual agreement where files are being shared in each direction, or there could be some contractual or regulatory requirement. In one embodiment, the system logging and reporting Subsystem 60 is called to record all key transactions that take place during the ADRS file sharing process 82.

At Step 74, the server network device 20, 22, 24 securely retrieves a copy of the requested secure transformed electronic document 13 from the one or more databases 20' 22'.

Returning to FIG. 10 at Step 76, the requested document is securely transferred to first application 30 on the target network device 12, 14, 16 from the second application 30' on the server network device 20, 22, 24 for secure viewing.

Subscribers have the ability to navigate and manage their Submitted and Received files on the ADRS 10. The System 10 enables them to view and manipulate files in a sortable list format or in a file system directory-type layout, depending on the embodiment.

Subscribers may view files logged in to the ADRS 10, or via a desktop application 30 provided by ADRS 10, that provides the Subscriber with a virtual view of their files and file information stored ADRS 10 from their desktop.

In one embodiment, file lists display key information including, but not limited to the organization and name of submitter, the original filename and file size, Check-In date, grouping and sub-grouping categories, link to the original file for viewing or downloading, symbols indicating whether the file is Shared with other Subscribers or has been Received from another Subscriber, a link to a file detail page, a link to begin the file sharing process (only if the viewer has the rights to the file), file type, etc.

The file detail page displays detailed information about the file including, but not limited to, all file characteristics details, description text associated with the groups, sub-groups and the file itself; if the file is being Shared with other subscribers, a list of all Receivers, the date shared, and expiration of sharing period, if applicable; if the file was Received from another Subscriber, that Subscriber's identifying information.

The method and system described herein provide an automatic document registration system that creates a secure transformed electronic document with an unalterable time and date stamp. Multiple third-parties are provided an ability to view a given original document in secure transformed electronic document format and each original individual document is provided with unique set of approved third-party receivers/viewers/auditors via a virtual matrixed file system.

Cloud Computing Networks

The methods and systems described above and illustrated in FIGS. 1-13 are also used in a cloud computing environment on a cloud communications network 18.

Figure 14:
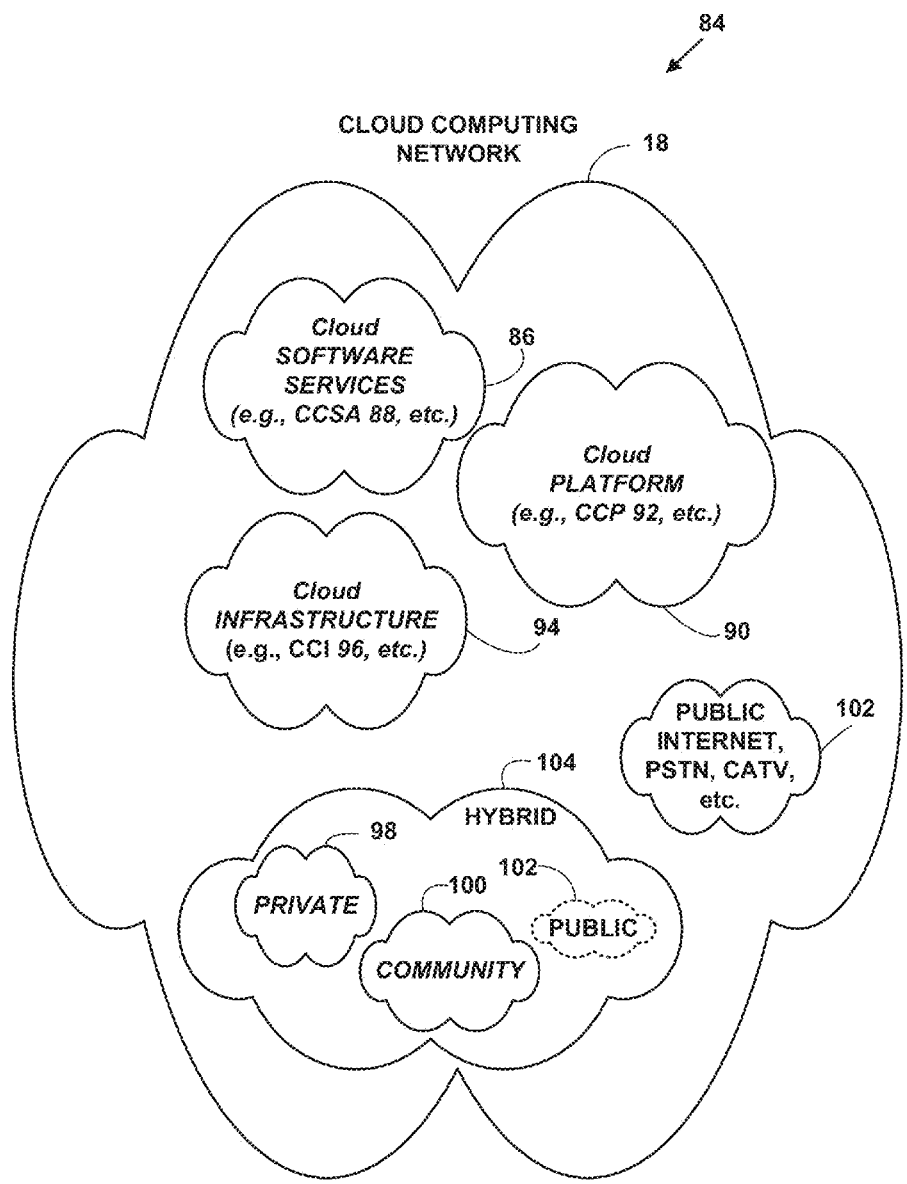
FIG. 14 is a block diagram illustrating an exemplary cloud communications network.

FIG. 14 is a block diagram 84 illustrating an exemplary cloud communications network 18. However, the present invention is not limited to this cloud computing model and other cloud computing models can also be used to practice the invention. The exemplary cloud communications network includes both wired and/or wireless components of public and private networks.

This exemplary cloud communications model for intelligent electronic information processing promotes availability for shared resources and comprises: (1) cloud communications essential characteristics; (2) cloud communications service models; and (3) cloud communications deployment models. However, the present invention is not limited to this cloud communications model and other cloud communications models can also be used to practice the invention.

The cloud communications network 18 provides on-demand self-service, broad network access, resource pooling, rapid elasticity and measured electronic services for electronic storage and retrieval.

The cloud source network devices include server network devices 20, 22, 24. In another embodiment, the cloud source network devices include a gateway and/or router and/or switch and/or edge server network device each with one or more processors.

In one embodiment, the cloud server network devices 20, 22, 24 and/or the target network devices 12, 14, 16 include a wireless networking interface comprising $4^{th}$ generation (4G) Worldwide Interoperability for Microwave Access (WiMax) Long Term Evolution (LTE) wireless interface in communications with the cloud communications network 18. However, the present invention is not limited to this embodiment and other types of wireless networking interfaces can be used to practice the invention.

Exemplary cloud communications essential characteristics appear in Table 2. However, the present invention is not limited to these essential characteristics and more, fewer or other characteristics can also be used to practice the invention.

TABLE 2

On-demand electronic document registration services. Electronic document registration services can unilaterally provision computing capabilities, such as server time and network storage, as needed automatically without requiring human interaction with each network server on the cloud communications network 18.
Broadband network access. Electronic document registration services capabilities are available over plural broadband communications networks and accessed through standard mechanisms that promote use by heterogeneous thin or thick client platforms 12, 14, 16 (e.g., mobile phones, smart phones, tablet computers, laptops, PDAs, etc.). The broadband network access includes high speed network access such as 3G and/or 4G wireless and/or wired and broadband and/or ultra-broad band (e.g., WiMAX, etc.) network access.
Resource pooling. Electronic document registration services resources are pooled to serve multiple requesters using a multi-tenant model, with different physical and virtual resources dynamically assigned and re-assigned according to document registration services demand. There is location independence in that an requester of electronic content has no control and/or knowledge over the exact location of the provided by the electronic document registration services resources but may be able to specify location at a higher level of abstraction (e.g., country, state, or datacenter). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for electronic document registration services. To the electronic document registrater, the electronic document registration services available for provisioning appear to be unlimited and can be used in any quantity at any time.
Measured Services. Cloud communications systems automatically control and optimize resource use by leveraging a metering capability at some level of abstraction appropriate to the type of electronic document registration services (e.g., storage, processing, bandwidth, custom electronic content retrieval applications, etc.). Electronic document registration service usage is monitored, controlled, and reported providing transparency for both the electronic content provider and the electronic document registration/viewing requester of the utilized electronic document registration services.

Exemplary cloud communications service models illustrated in FIG. 14 appear in Table 3. However, the present invention is not limited to these service models and more, fewer or other service models can also be used to practice the invention.

TABLE 3

Cloud Computing Software Applications 86 for an Electronic Document Registration Services (CCSA 88). The capability to use the provider's applications 30, 30' running on a cloud infrastructure 90. The cloud computing applications 30, 30' are accessible from the server network devices 20, 22, 24 from various client target network devices 12, 14, 16 through a thin client interface such as a web browser plug-in, etc. The user does not manage or control the underlying cloud infrastructure 90 including network, servers, operating systems, storage, or even individual application 30, 30' capabilities, with the possible exception of limited user-specific application configuration settings.
Cloud Computing Infrastructure 90 for the an Electronic Document Registration Service (CCI 92). The capability provided to the user is to provision processing, storage, networks 18, 98, 100, 102, 104 and other fundamental computing resources where the consumer is able to deploy and run arbitrary software, which can include operating systems and applications 30, 30'. The user does not manage or control the underlying cloud infrastructure 90 but has control over operating systems, storage, TABLE 3-continued deployed applications, and possibly limited control of select networking components (e.g., host firewalls, etc.).
Cloud Computing Platform 94 for the an Electronic Document Registration Service (CCP 96). The capability provided to the user to deploy onto the cloud infrastructure 90 created or acquired applications created using programming languages and tools supported servers 20, 22, 24, etc.. The user not manage or control the underlying cloud infrastructure 90 including network, servers, operating systems, or storage, but has control over the deployed applications 30, 30' and possibly application hosting environment configurations.

Exemplary cloud computing deployment models appear in Table 4. However, the present invention is not limited to these deployment models and more, fewer or other deployment models can also be used to practice the invention.

TABLE 4

Private cloud network 98. The cloud network infrastructure is operated solely for an electronic content retrieval organization. It may be managed by the electronic document registration or a third party and may exist on premise or off premise.
Community cloud network 100. The cloud network infrastructure is shared by several different organizations and supports a specific electronic document registration community that has shared concerns (e.g., mission, securityrequirements, policy, compliance considerations, etc.). It may be managed by the different organizations or a third party and may exist on premise or off premise.
Public cloud network 102. The cloud network infrastructure such as the Internet, PSTN, CATV, etc. is made available to the general public or a large industry group and is owned by one or more organizations selling cloud services.
Hybrid cloud network 104. The cloud network infrastructure 90 is a composition of two and/or more cloud networks 18 (e.g., private 98, community 100, and/or public 102, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software services 88 for electronic document registration takes full advantage of the cloud paradigm by being service oriented with a focus on statelessness, low coupling, modularity, and semantic interoperability for electronic content retrieval. However, cloud software services 88 can include various states.

In on exemplary embodiment, the application 30, 30', offers additional cloud services for electronic document registration. The application 30, 30' offers the cloud computing Infrastructure 90, 92 as a Service 86 (IaaS), including a cloud software service 88, the cloud Platform 94, 96 as a Service 86 (PaaS) including a cloud software service 88, and/or offers Specific cloud software services as a Service 86 (SaaS) including a cloud software service 88. The IaaS, PaaS and SaaS include one or more of cloud services 86 comprising networking, storage, server network device, virtualization, operating system, middleware, run-time, data and/or application services, or plural combinations thereof, on the cloud communications network 18.

The source and target cloud computing applications 30, 30' include a cloud computing based electronic document registration service CCSA 88, a cloud computing platform CCP 96 for the electronic document registration service and a cloud computing infrastructure CCI 92 for the electronic document registration service.

The cloud applications 30, 30' provide electronic document registration from internet television services, search engine services and/or social networking services. However, the present invention is not limited to this embodiment and the cloud applications 30, 30' may provide electronic document registration from more, fewer or other services.

Internet Television Services

The cloud applications 30, 30' provide electronic document registration from television services over the cloud communications network 18. The television services include CATV, satellite TV, Internet television, Web-TV, Internet Protocol Television (IPtv) and/or broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

Search Engine Services

The cloud applications 30, 30' provide electronic document registration from general search engine services. A search engine is designed to search for information on a cloud communications network 18 such as the Internet including World Wide Web servers, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

The cloud applications 30, 30' provide electronic document registration from general search engine services as stand alone services. In another embodiment, the applications 30, 30' provide general search engine services by interacting with one or more other public search engines (e.g., GOOGLE, BING, YAHOO, etc.) and/or private search engine services.

The cloud applications 30, 30' also provide electronic document registration from specialized search engine services, such as vertical search engine services by interacting with one or more other public vertical search engines (e.g., GALAXY.COM, etc.) and/or private search engine services.

However, the present invention is not limited to providing electronic document registration from such general and/or vertical search engine services and more, fewer and/or other types of electronic document registration can be provided from other types of general sand/or specialized search engine services can be used to practice the invention.

Social Networking Services

In one embodiment, the cloud applications 30, 30' provide electronic document registration from one or more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS/ATOM feeds, and other types of information web-sites in which messages can be left or posted for a variety of social activities.

However, the present invention is not limited to the social networking services described and other public and private social networking services can also be used to practice the invention.

Cloud Storage Objects

Cloud storage of secure electronic document registrations on a cloud communications network 18 includes agility, scalability, elasticity and multi-tenancy. Although a storage foundation may be comprised of block storage or file storage such as that exists on conventional networks, cloud storage is typically only exposed to requesters of desired electronic content as "cloud storage objects" (e.g., 108, FIG. 15, etc.).

FIG. 15 is a block diagram 106 illustrating an exemplary cloud storage object 108.

The cloud storage object 108 includes an envelope portion 110, with a header portion 112, and a body portion 114. However, the present invention is not limited to such a cloud storage object 108 and other cloud storage objects and other cloud storage objects with more, fewer or other portions can also be used to practice the invention.

The envelope portion 110 uses unique namespace Uniform Resource Identifiers (URIs) and/or Uniform Resource Names (URNs), and/or Uniform Resource Locators (URLs) unique across the cloud communications network 18 to specify, location and version information and encoding rules used by the cloud storage object 108. For more information, see IETF RFC-3305, Uniform Resource Identifiers (URIs), URLs, and Uniform Resource Names (URNs), the contents of which are incorporated by reference.

The envelope portion 110 of the cloud storage object 108 is followed by a header portion 112. The header portion 112 includes extended information about the cloud storage objects such as authorization and/or transaction information, etc.

The body portion 114 includes methods 116 (i.e., a sequence of instructions, etc.) for using embedded application-specific data in data elements 120. The body portion 118 typically includes only one portion of plural portions of the application-specific data so the cloud storage object 108 can provide distributed, redundant fault tolerant, security and privacy features described herein.

Cloud storage objects 108 have proven experimentally to be a secure, highly scalable, distributed, available and reliable layer of abstraction that also minimizes the limitations of common file systems. Cloud storage objects 108 also provide low latency and low storage and transmission costs.

Cloud storage objects 108 are comprised of plural distributed storage locations, but function as a single storage object, are highly fault tolerant through redundancy and provide distribution of desired electronic content across public communication networks 102, and one or more private networks 98, community networks 100 and hybrid networks 104 of the cloud communications network 18. Cloud storage objects 108 are also highly durable because they also initiate creation of copies of portions of desired electronic content across such networks 98, 100, 102, 104 of the cloud communications network 18. Cloud storage objects 108 are stored on one or more of the 98, 100, 102, 104 networks of the cloud communications network 18 and/or on the target network device 12, 14, 16. Cloud storage objects 108 are transparent to a requester of desired electronic content and are managed by cloud computing application 30, 30'.

Cloud storage objects 108 comprise plural storage objects distributed on cloud source network devices 20, 22, 24, and/or other storage devices (e.g., gateway, router, bridge, switch, edge server, etc.) and/or the target network devices 12, 14, 16 with a size up to hundreds of terabytes, each accompanied by with a few kilobytes of metadata. Cloud storage objects 108 are organized into and each identified by a unique identifier unique across the whole cloud communications network 18. However, the present invention is not limited to the cloud storage objects described, and more fewer and other types of cloud storage objects can be used to practice the invention.

Cloud storage objects 108 present a single unified namespace or object-space and manages desired electronic content by user or administrator-defined policies storage and retrieval policies.

In one exemplary embodiment, cloud storage objects 108 include Representational state transfer (REST). Simple Object Access Protocol (SOAP) and/or an Application Programming Interface (API) and/or other types of cloud storage objects. However, the present invention is not limited to the cloud storage objects described, and more fewer and other types of cloud storage objects can be used to practice the invention.

REST characterizes and constrains macro-interactions of the four components of a cloud communications network 18, namely origin servers, gateways, proxies and clients, without imposing limitations on the individual participants.

SOAP is a protocol specification for exchanging structured information in the implementation of cloud services. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

An API is a particular set of rules and specifications that software programs can follow to communicate with each other. It serves as an interface between different software programs and facilitates their interaction.

Automatic Document Registration with Cloud Computing

FIGS. 16A, 16B and 16C are a flow diagram illustrating a Method 122 for automatic electronic document registration with cloud computing.

In FIG. 16A at Step 124, an original electronic document is received on a first cloud application stored in a non-transitory computer readable medium on a target network device with one or more processors via a cloud communications network. The cloud communications network comprises one or more public communication networks, one or more private networks, one or more community networks and one or more hybrid networks. At Step 126, the first cloud application automatically applies a first set of electronic document registration rules to the original electronic document. The first set of electronic document registration rules include document registration rules applied to all electronic document being registered via an automatic document registration system, thereby creating a first level modified electronic document. At Step 128, the first cloud application automatically applies a second set of electronic document registration rules to the first level modified electronic document thereby creating a second level modified electronic document. The second set of electronic document registration rules include local document registration rules applied only via the cloud application on the target network device.

In FIG. 16B at Step 130, the first cloud application automatically transforms the second level modified electronic document into a secure cloud electronic document storage format using a pre-determined set of electronic document transformation rules thereby creating a secure cloud transformed electronic document. At Step 132, the first cloud application automatically generates plural electronic document registration codes for the secure cloud transformed electronic document. The plural electronic document registration codes include an unalterable date and time stamp, an identification code and one or more encryption codes. At Step 134, the first application from the target network device securely transfers the secure cloud transformed electronic document via the via the cloud communications network to a cloud server network device with one or more processors, one or more different databases and a second cloud application executing in a second non-transitory computer readable medium on the sever network device.

In FIG. 16C at Step 136, a second cloud application on the cloud server network device stores the secure cloud transformed electronic document as a cloud storage object. The cloud storage object comprises plural separate portions stored in plural separate secure storage locations on plural other different cloud server network devices distributed across the cloud communications network but functions as a single secure cloud storage object. The first cloud application on the target network device cannot determine which other different cloud server network devices on the one or more public, private, community or hybrid networks on the cloud communications network may have stored the cloud storage object or portions thereof, thereby providing additional security and privacy for the secure cloud transformed electronic document. The secure cloud transformed electronic document can be viewed via the target network device and other target devices from anywhere on the cloud communications network without the ability to tamper with the information within the secure cloud transformed electronic document thereby providing an automatic secure electronic document registration system on the cloud communications network.

Method 122 is illustrated with one exemplary embodiment. However, the present invention is not limited to this embodiment and other embodiments can also be used to practice the invention.

In such an exemplary embodiment in FIG. 16A at Step 124 original electronic document 11 is received on a first cloud application 30 stored in a non-transitory computer readable medium on a target network device 12, 14, 16 with one or more processors via a cloud communications network 18. The cloud communications network 18 comprises, one or more private networks 98, one or more community networks 100, one or more hybrid networks 104 and/or one or more public networks 102.

In one embodiment, the original electronic document 11 includes a legal document (e.g., a contract, deed, title stock option grant, will, trust, etc.) and/or a non-legal document (e.g., a manuscript, etc.).

At Step 126, the first cloud application 30 automatically applies a first set of electronic document registration rules to the original electronic document 11. The first set of electronic document registration rules include document registration rules applied to all original electronic documents being registered via the automatic document registration system 10 (i.e., is an application of a system wide set of rules), thereby creating a first level modified electronic document.

For example, the first set of electronic document registration rules may include rules to be applied for a file type (e.g., Microsoft Word, Portable Data Format (PDF), etc.) a type of encryption (e.g., DES, MD5, etc.), a type of file compression, etc.

In one embodiment, the first set of electronic document registration rules includes credential rules. In such an embodiment, at Step 126, credentials for a user of the target network device 12, 14, 16 are verified. In such an embodiment, the credentials are verified automatically based on a stored static user profile. In another embodiment, the credentials are verified automatically and dynamically by having a user enter a password, complete a biometric scan, etc. that is accepted on the first application 30. In another embodiment, the credentials are automatically read from a user profile file by application 30. However, the present invention is not limited to these embodiments and other embodiments may also be used to practice the invention.

At Step 128, a second set of electronic document registration rules is applied via the first cloud application 30 to the first level modified electronic document thereby creating a second level modified electronic document. The second set of electronic document registration rules include local document registration rules applied only via the application on the target network device 12, 14, 16 (i.e., is an application of a local set of rules).

For example, the second set of electronic document registration rules may include a file type (e.g., Microsoft Word, Portable Data Format (PDF), etc.) a type of file compression, a display type (e.g. type of graphical window, font color, font size, etc.) etc. set up and used only the target device 12, 14, 16.

In one embodiment, Steps 126 and 128 are accomplished by automatically applying the first and second set of rules stored in a document profile stored in the non-transitory computer readable medium on the target network device 12, 14, 16.

At Step 130, the first cloud application 30 automatically transforms the second level modified electronic document into a secure cloud electronic document storage format using a pre-determined set of electronic document transformation rules thereby creating a secure cloud transformed electronic document 13. (e.g., see FIG. 4, Table 1 and corresponding explanation above, etc.)

In FIG. 16B at Step 132, the first cloud application 30 automatically generates plural electronic document registration codes for the secure cloud transformed electronic document 13. The plural electronic document registration codes include an unalterable date and time stamp, an identification code and one or more encryption codes. (e.g., see FIGS. 5-10 and corresponding explanation above, etc.).

At Step 134, the first cloud application 30' from the target network device 12, 14, 16 securely transfers the secure cloud transformed electronic document 13 via the via the cloud communications network 18 to a cloud server network device 20, 22, 24 with one or more processors, one or more different databases 20', 22', 24' and a second cloud application 30' executing in a second non-transitory computer readable medium on the server network device 20, 22, 24.

In FIG. 16C at Step 136, second cloud application 30' on the cloud server network device 20, 22, 24 stores the secure cloud transformed electronic document 13 as a cloud storage object 108. The cloud storage object 108 comprises plural separate portions stored in plural separate secure storage locations on plural other different cloud server network devices 20, 22, 24 distributed across the cloud communications network 17 but functions as a single secure cloud storage object 108. The first cloud application on the target network device 12, 14, 16 cannot determine which other different cloud server network devices 20, 22, 24, on the one or more public 102, private 98, community 100 or hybrid networks 104 on the cloud communications network 18 may have stored the cloud storage object 108 or portions thereof, thereby providing additional security and privacy for the secure cloud transformed electronic document 13.

In one exemplary embodiment, cloud storage objects 108 include REST, SOAP, API and/or other types of cloud storage objects 108. However, the present invention is not limited to the cloud storage objects described, and more fewer and other types of cloud storage objects can be used to practice the invention.

The secure cloud transformed electronic document 13 is viewed via the target network device 12 and other target devices 14, 16 from anywhere on the cloud communications network 18 without the ability to tamper with the information within the secure cloud transformed electronic document thereby providing an automatic secure electronic document registration system 10 on the cloud communications network 18.

FIG. 17 is a flow diagram illustrating a Method 138 for viewing secure cloud transformed electronic documents transformed with method of FIG. 16.

At Step 140, a request is received from the first cloud application on the target network device via the cloud communications network on the second cloud application the cloud server network device to view a selected secure cloud transformed electronic document stored on the cloud communications network. At Step 142, the second cloud application on the cloud server network device verifies the first cloud application on the target network device is allowed to view the requested secure cloud transformed electronic file. At Step 144, the second cloud application on the server network device securely retrieves a copy of the requested secure transformed electronic document from the other different cloud server network devices on the cloud communications network. At Step 146, the requested secure cloud transformed electronic document is securely transferred to the first cloud application on the target network device from the second cloud application on the server network device via the cloud communications network for secure viewing on the first cloud application.

Method 138 is illustrated with one exemplary embodiment. However, the present invention is not limited to this embodiment and other embodiments can also be used to practice the invention.

In such an exemplary embodiment, at Step 140, a request is received from the first cloud application 30 on the target network device 12, 14, 16 via the cloud communications network 18 on the second cloud application 30' the cloud server network device 20, 22, 24 to view a selected secure cloud transformed electronic document 13 stored on the cloud communications network.

At Step 142, the second cloud application 30' on the cloud server network device 20, 22, 24 verifies the first cloud application 30 on the target network device 12, 14, 16 is allowed to view the requested secure cloud transformed electronic document 13, (See FIGS. 10-13 and corresponding explanation above, etc.).

At Step 144, the second cloud application 30' on the cloud server network device 20, 22, 24 securely retrieves a copy of the requested secure transformed electronic document 13 from the other different one or more server network devices 20, 22, 24 on the cloud communications network 18.

In one embodiment, Step 144 includes retrieving securely plural portions of the requested secure cloud transformed electronic document 13 as the plural portions of the cloud storage object 108 from the plural separate secure storage locations on the plurality of other different cloud server network devices 20, 22, 24 distributed and stored across the one or more public communication networks 102, one or more private networks 98, one or more community networks 100 and one or more hybrid networks 104 of the cloud communications network 18. The retrieved plural portions of the requested secure cloud transformed electronic document 13 are combined into a complete electronic document for secure viewing on the first cloud application as the requested secure cloud transformed electronic document 13.

In on embodiment, the combining step includes combining the plural portions of the cloud storage object 108 into one portion of the requested secure cloud transformed electronic document 13 by extracting information from the plural portions (e.g., plural portions of 118, 120, etc.) of the cloud storage object 108 and placing the extracted information into a pre-determined format for the requested secure cloud transformed electronic document 13.

However, the invention is not limited to these embodiments, Method 138 can be practiced with and/or without the additional steps described.

Returning to Step 146, the requested secure cloud transformed electronic document 13 is securely transferred to the first cloud application 30 on the target network device 12, 14, 16 from the second cloud application 30' on the cloud server network device 20, 22, 24 via the cloud communications network 18 for secure viewing on the first cloud application 30.

The method and system described herein provide an automatic cloud document registration system that creates a secure cloud transformed electronic document with an unalterable time and date stamp stored in a cloud storage object. The cloud storage object comprises plural separate portions stored in plural separate secure storage locations on plural other different server network devices distributed across the cloud communications network but functions as a single secure cloud storage object. Target and server network devices cannot determine which other different server network devices on the one or more public private community or hybrid networks on the cloud communications network may have stored the cloud storage object or portions thereof, thereby providing additional security and privacy for the secure cloud transformed electronic document. Multiple third-parties are provided an ability to view a given original document in secure cloud transformed electronic document format and each original individual document is provided with unique set of approved third-party receivers/viewers/auditors via a virtual matrixed file system that is useable and allows the secure cloud transformed electronic document to be viewed from anywhere on the cloud communications network.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for automatic registration of electronic documents with cloud computing, comprising:

receiving an original electronic document on a first cloud application stored in a non-transitory computer readable medium on a target network device with one or more processors via a cloud communications network comprising: one or more public communication networks, one or more private networks, one or more community networks and one or more hybrid networks;

automatically applying via the first cloud application a first set of electronic document registration rules to the original electronic document, wherein the first set of electronic document registration rules include document registration rules applied to all electronic document being registered via an automatic document registration system, thereby creating a first level modified electronic document;

automatically applying via the first cloud application a second set of electronic document registration rules to the first level modified electronic document thereby creating a second level modified electronic document, wherein the second set of electronic document registration rules include local document registration rules applied only via the cloud application on the target network device;

automatically transforming via the first cloud application the second level modified electronic document into a secure cloud electronic document storage format using a pre-determined set of electronic document transformation rules thereby creating a secure cloud transformed electronic document;

automatically generating via the first cloud application a plurality of electronic document registration codes for the secure cloud transformed electronic document, wherein the plurality of electronic document registration codes includes an unalterable date and time stamp, an identification code and one or more encryption codes;

securely transferring the secure cloud transformed electronic document with the first cloud application from the target network device via the cloud communications network to a cloud server network device with one or more processors, one or more different databases and a second cloud application executing in a second non-transitory computer readable medium on the sever network device; and storing the secure cloud transformed electronic document from the second cloud application on the cloud server network device as a cloud storage object, wherein the cloud storage object comprises a plurality of separate portions stored in a plurality of separate secure storage locations on a plurality of other different cloud server network devices distributed across the cloud communications network but functions as a single secure cloud storage object, wherein the first cloud application on the target network device cannot determine which other different cloud server network devices on the one or more public, private, community or hybrid networks on the cloud communications network may have stored the cloud storage object or portions thereof, thereby providing additional security and privacy for the secure cloud transformed electronic document, and wherein the secure cloud transformed electronic document can be viewed via the target network device and other target devices from anywhere on the cloud communications network without the ability to tamper with the information within the secure cloud transformed electronic document thereby providing an automatic secure electronic document registration system on the cloud communications network.

2. The method of claim 1 wherein the cloud storage object includes one or more of a REpresentational State Transfer (REST) or Simple Object Access Protocol (SOAP) cloud storage objects, portions thereof, or a combination thereof.

3. The method of claim 1 wherein the first and second cloud applications offer the cloud computing Infrastructure as a Service (IaaS), the cloud computing Platform, as a Service (PaaS) and offers Specific cloud automatic secure electronic document registration services as a Service (SaaS) including a cloud software service, wherein the IaaS, PaaS and SaaS include one or more of automatic secure electronic document registration services comprising networking, storage, server network device, virtualization, operating system, middleware, run-time, data or application services, or plural combinations thereof, on the cloud communications network.

4. The method of claim 1 wherein the cloud automatic secure electronic document registration services are provided via internet television services, search engine services and/or social networking services on the cloud communications network.

5. The method of claim 1 wherein the cloud communications network includes on-demand automatic secure electronic document registration services and broadband network access, resource pooling, rapid elasticity and measured network services for cloud automatic secure electronic document registration services.

6. The method of claim 1 wherein the target network device includes desktop computers, laptop computers, tablet computers, mobile phones, non-mobile phones, smart phones, electronic tablets, Internet phones, Internet appliances, personal digital/data assistants (PDA), digital cameras, portable game consoles, non-portable game consoles, cable television (CATV) set-top boxes, satellite television boxes, or digital televisions including a high definition television (HDTV) or a three-dimensional (3D) television.

7. The method of claim 1 wherein the server network device and the target network device include a wireless networking interface comprising a Worldwide Interoperability for Microwave Access (WiMax) wireless networking interface with $4^{th}$ generation (4G) wireless speeds for communicating with the cloud communications network.

8. The method of claim 1 wherein the secure cloud transformed electronic document format includes an un-viewable encrypted, hashed, message digested format.

9. The method of claim 1 wherein the secure cloud transformed electronic document format includes a read-only view format.

10. The method of claim 1 wherein the secure cloud transformed electronic document is stored in the cloud storage object using Lightweight Directory Access Protocol (LDAP) and securely accessed from the cloud storage object via the X.509 security protocol.

11. The method of claim 1 further comprising:
storing one or more portions of the cloud storage object in the one or more different databases on the cloud communications network using one or more of a plurality of pre-determined virtual file associations for secure cloud transformed electronic document documents in a pre-determined hierarchical structure of security groups and security sub-groups for storing, sharing and retrieving secure transformed electronic documents, wherein a single secure cloud transformed electronic document can reside in a plurality of pre-determined virtual file associations and a plurality of pre-determined security groups and security sub-groups at a same time.

12. The method of claim 1 wherein a copy of the unalterable date and time stamp is encrypted and included in the secure cloud transformed electronic document or a biometric collected from a user of the target network device is encrypted and included in the secure cloud transformed electronic document with the unalterable date and time stamp.

13. The method of claim 1 wherein the secure cloud transformed electronic document includes an original legal electronic document or an original non-legal document.

14. The method of claim 1 wherein the one or more different databases include a virtual cloud file system that creates a virtual matrixed directory structure by establishing file accesses based on assigning a files to any number of security groups and security sub-groups instead of designating the files to directories and subdirectories in the virtual cloud file system.

15. The method of claim 14 wherein the virtual cloud file system allows the virtual matrixed directory structure to be overlaid to a plurality of other viewers who have permission to view the secure cloud transformed electronic document.

16. The method of claim 1 further comprising:
receiving a request from the first cloud application on the target network device via the cloud communications network on the second cloud application on the cloud server network device to view a selected secure cloud transformed electronic document stored on the cloud communications network;

verifying on the second cloud application on the cloud server network device that the first cloud application on the target network device is allowed to view the requested secure cloud transformed electronic file;

retrieving securely on the second cloud application on the cloud server network device a copy of the requested secure transformed electronic document from the other different one or more server network devices on the cloud communications network; and securely transferring the requested secure cloud transformed electronic document to the first cloud application on the target network device from the second cloud application on the cloud server network device via the cloud communications network for secure viewing on the first cloud application.

17. The method of claim 16 wherein the retrieving securely step includes:
retrieving securely on the second cloud application a plurality of portions of the requested secure cloud transformed electronic document as the plurality of portions of the cloud storage object from the plurality of separate secure storage locations on the plurality of other different server network devices distributed and stored across the one or more public communication networks, one or more private networks, one or more community networks and one or more hybrid networks of the cloud communications network; and combining on the second cloud application the retrieved plurality of portions of the requested secure cloud transformed electronic document in a complete electronic document for secure viewing on the first cloud application as the requested secure cloud transformed electronic document.

18. The method of claim 17 wherein the combining step includes combining the plurality of portions of the cloud storage object into one portion of the requested secure cloud transformed electronic document by extracting information from the plurality of portions of the cloud storage object and placing the extracted information into a pre-determined format for the requested secure cloud transformed electronic document.

19. A non-transitory computer readable medium having stored therein a plurality of instructions for causing one or more processors on one or more network devices to execute the steps of:
  receiving an original electronic document on a first cloud application stored in a non-transitory computer readable medium on a target network device with one or more processors via a cloud communications network comprising: one or more public communication networks, one or more private networks, one or more community networks and one or more hybrid networks;
  automatically applying via the first cloud application a first set of electronic document registration rules to the original electronic document, wherein the first set of electronic document registration rules include document registration rules applied to all electronic document being registered via an automatic document registration system, thereby creating a first level modified electronic document;
  automatically applying via the first cloud application a second set of electronic document registration rules to the first level modified electronic document thereby creating a second level modified electronic document, wherein the second set of electronic document registration rules include local document registration rules applied only via the cloud application on the target network device;
  automatically transforming via the first cloud application the second level modified electronic document into a secure cloud electronic document storage format using a pre-determined set of electronic document transformation rules thereby creating a secure cloud transformed electronic document;
  automatically generating via the first cloud application a plurality of electronic document registration codes for the secure cloud transformed electronic document, wherein the plurality of electronic document registration codes includes an unalterable date and time stamp, an identification code and one or more encryption codes;
  securely transferring the secure cloud transformed electronic document with the first cloud application from the target network device via the cloud communications network to a cloud server network device with one or more processors, one or more different databases and a second cloud application executing in a second non-transitory computer readable medium on the sever network device; and
  storing the secure cloud transformed electronic document from the second cloud application on the cloud server network device as a cloud storage object,
  wherein the cloud storage object comprises a plurality of separate portions stored in a plurality of separate secure storage locations on a plurality of other different cloud server network devices distributed across the cloud communications network but functions as a single secure cloud storage object,
  wherein the first cloud application on the target network device cannot determine which other different cloud server network devices on the one or more public, private, community or hybrid networks on the cloud communications network may have stored the cloud storage object or portions thereof, thereby providing additional security and privacy for the secure cloud transformed electronic document, and
  wherein the secure cloud transformed electronic document can be viewed via the target network device and other target devices from anywhere on the cloud communications network without the ability to tamper with the information within the secure cloud transformed electronic document thereby providing an automatic secure electronic document registration system on the cloud communications network.

20. A system for automatic registration of electronic documents with cloud computing, comprising in combination for:
  receiving an original electronic document on a first cloud application stored in a non-transitory computer readable medium on a target network device with one or more processors via a cloud communications network comprising: one or more public communication networks, one or more private networks, one or more community networks and one or more hybrid networks;
  automatically applying via the first cloud application a first set of electronic document registration rules to the original electronic document, wherein the first set of electronic document registration rules include document registration rules applied to all electronic document being registered via an automatic document registration system, thereby creating a first level modified electronic document;
  automatically applying via the first cloud application a second set of electronic document registration rules to the first level modified electronic document thereby creating a second level modified electronic document, wherein the second set of electronic document registration rules include local document registration rules applied only via the cloud application on the target network device;
  automatically transforming via the first cloud application the second level modified electronic document into a secure cloud electronic document storage format using a pre-determined set of electronic document transformation rules thereby creating a secure cloud transformed electronic document;
  automatically generating via the first cloud application a plurality of electronic document registration codes for the secure cloud transformed electronic document, wherein the plurality of electronic document registration codes includes an unalterable date and time stamp, an identification code and one or more encryption codes;
  securely transferring the secure cloud transformed electronic document with the first cloud application from the target network device via the cloud communications network to a cloud server network device with one or more processors, one or more different databases and a second cloud application executing in a second non-transitory computer readable medium on the sever network device; and
  storing the secure cloud transformed electronic document from the second cloud application on the cloud server network device as a cloud storage object,
  wherein the cloud storage object comprises a plurality of separate portions stored in a plurality of separate secure storage locations on a plurality of other different cloud server network devices distributed across the cloud communications network but functions as a single secure cloud storage object, wherein the first cloud application on the target network device cannot determine which other different cloud server network devices on the one or more public, private, community or hybrid networks on the cloud communications network may have stored the cloud storage object or portions thereof, thereby providing additional security and privacy for the secure cloud transformed electronic document, and wherein the secure cloud transformed electronic document can be viewed via the target network device and other target devices from anywhere on the cloud communications network without the ability to tamper with the information within the secure cloud transformed electronic document thereby providing an automatic secure electronic document registration system on the cloud communications network;

receiving a request from the first cloud application on the target network device via the cloud communications network on the second cloud application the cloud server network device to view a selected secure cloud transformed electronic document stored on the cloud communications network;

verifying on the second cloud application on the cloud server network device that the first cloud application on the target network device is allowed to view the requested secure cloud transformed electronic file;

retrieving securely on the second cloud application on the cloud server network device a copy of the requested secure transformed electronic document from the other different one or more server network devices on the cloud communications network; and securely transferring the requested secure cloud transformed electronic document to the first cloud application on the target network device from the second cloud application on the cloud server network device via the cloud communications network for secure viewing on the first cloud application.

* * * * *